(12) United States Patent
Iseki et al.

(10) Patent No.: US 9,649,577 B2
(45) Date of Patent: May 16, 2017

(54) BUBBLE REMOVING METHOD, BUBBLE REMOVING APPARATUS, DEGASSING APPARATUS, AND COMPUTER-READABLE RECORDING MEDIUM

(71) Applicant: Tokyo Electron Limited, Tokyo (JP)

(72) Inventors: Tomohiro Iseki, Kumamoto (JP); Hideo Funakoshi, Hsin-chu (TW); Seiya Totsuka, Kumamoto (JP)

(73) Assignee: Tokyo Electron Limited, Tokyo (JP)

( * ) Notice: Subject to any disclaimer, the term of this patent is extended or adjusted under 35 U.S.C. 154(b) by 14 days.

(21) Appl. No.: 14/490,887

(22) Filed: Sep. 19, 2014

(65) Prior Publication Data
US 2015/0096441 A1   Apr. 9, 2015

(30) Foreign Application Priority Data
Oct. 4, 2013 (JP) ................................ 2013-209642

(51) Int. Cl.
B01D 19/00 (2006.01)

(52) U.S. Cl.
CPC ..... *B01D 19/0063* (2013.01); *B01D 19/0036* (2013.01)

(58) Field of Classification Search
CPC . B01D 19/0063; B01D 19/0036; B01D 23/00
USPC .......................................................... 95/259
See application file for complete search history.

(56) References Cited

U.S. PATENT DOCUMENTS

| 2002/0159919 A1* | 10/2002 | Churchill | ............. B01J 19/0046 422/400 |
| 2003/0210993 A1* | 11/2003 | Sabini | ..................... F04B 23/00 417/411 |

FOREIGN PATENT DOCUMENTS

| JP | 07-326570 A | 12/1995 |
| JP | 08-131909 A | 5/1996 |
| JP | 2000-097157 A | 4/2000 |
| JP | 2003-197513 A | 7/2003 |
| JP | 2004-195377 A | 7/2004 |
| JP | 2005-152769 A | 6/2005 |
| JP | 2008-539075 A | 11/2008 |
| WO | 2013/129252 A | 9/2013 |

* cited by examiner

Primary Examiner — Amber R Orlando
Assistant Examiner — Britanny Precht
(74) Attorney, Agent, or Firm — Abelman, Frayne & Schwab

(57) ABSTRACT

Disclosed is a bubble removing method in which fine bubbles are removed from a filter to improve the performance of the filter. The bubble removing method includes a step of degassing a processing liquid supplied from a supply source to prepare a highly degassed liquid (highly degassed liquid preparation), a step of supplying the prepared highly degassed liquid at a first processing liquid from a pump device to a filter device (temporary liquid permeation), a step of supplying the highly degassed liquid at a second processing liquid flow rate higher than the first processing liquid flow rate from the pump device to the filter device (initial liquid permeation), and a step of causing the highly degassed liquid to flow from the pump device to the filter device for a predetermined length of time (liquid permeation).

12 Claims, 14 Drawing Sheets

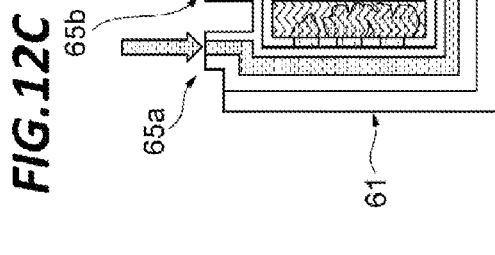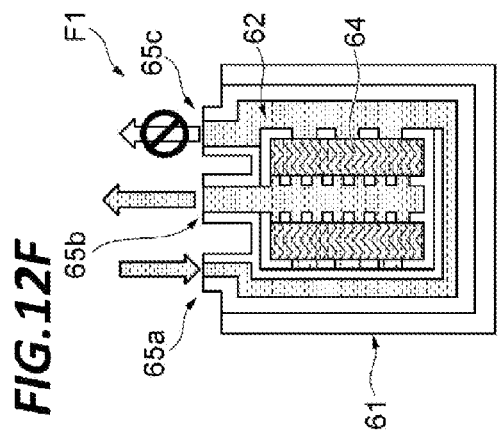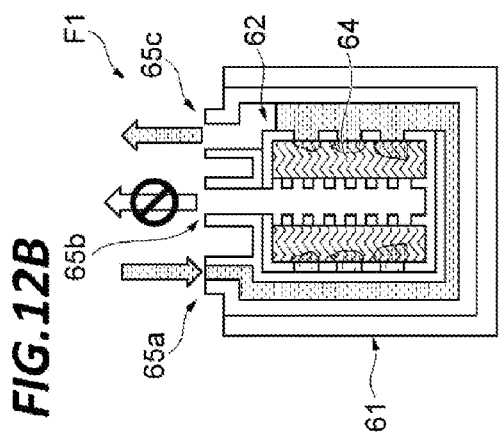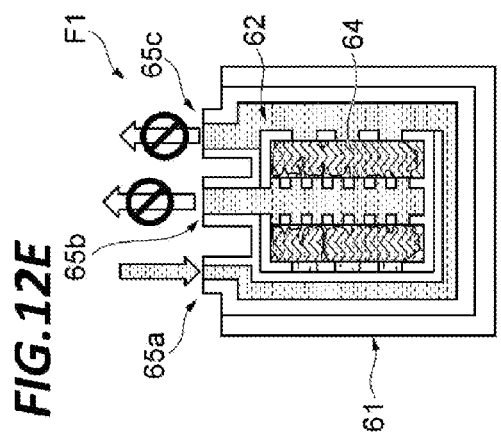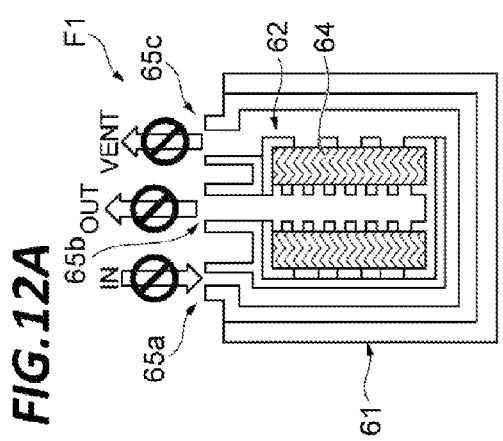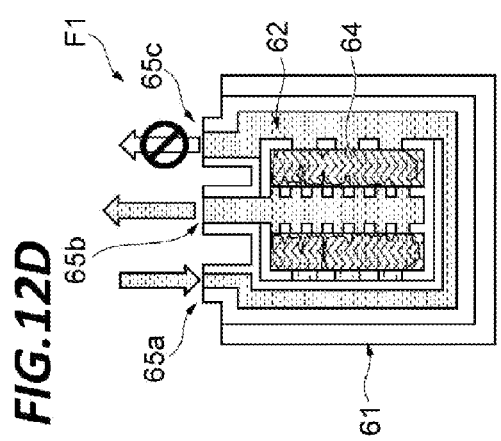

BUBBLE REMOVING METHOD, BUBBLE REMOVING APPARATUS, DEGASSING APPARATUS, AND COMPUTER-READABLE RECORDING MEDIUM

CROSS-REFERENCE TO RELATED APPLICATIONS

This application is based on and claims priority from Japanese Patent Application No. 2013-209642, filed on Oct. 4, 2013, with the Japan Patent Office, the disclosure of which is incorporated herein in its entirety by reference.

TECHNICAL FIELD

The present disclosure relates to a bubble removing method, a bubble removing apparatus, a degassing apparatus, and a computer-readable recording medium.

BACKGROUND

In performing, for example, a fine processing on a substrate (e.g., a semiconductor substrate), a processing liquid is generally ejected on the surface of the substrate. The processing liquid may originally include foreign matters such as particles (fine particles). When the processing liquid flows in a pipe toward an ejecting port, foreign matters such as particles from the pipe may be mixed into the processing liquid. Accordingly, for example, Japanese Patent Laid-Open Publication H7-326570 discloses a substrate processing apparatus in which a filter is disposed in the middle of the route of the processing liquid to remove the foreign matters.

SUMMARY

The present disclosure provides a method of removing bubbles. The method includes: a first step of supplying a processing liquid into a container through a degassing nozzle having a smaller flow path area at the container side than at a supply source side of the processing liquid of a substrate so as to degas the processing liquid supplied from the supply source; a second step of supplying a degassed liquid which is the processing liquid degassed in the first step to a filter device having a filter from the container, at a first processing liquid flow rate; a third step of supplying the degassed liquid from the container to the filter device at a second processing liquid flow rate which is higher than the first processing liquid flow rate; and a fourth step of causing the degassed liquid to flow from the container to the filter device for a predetermined length of time.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIGS. 12A to 12F are views for explaining the state of liquid permeation in a filter device in the filter maintenance mode.

DETAILED DESCRIPTION

Figure 1:
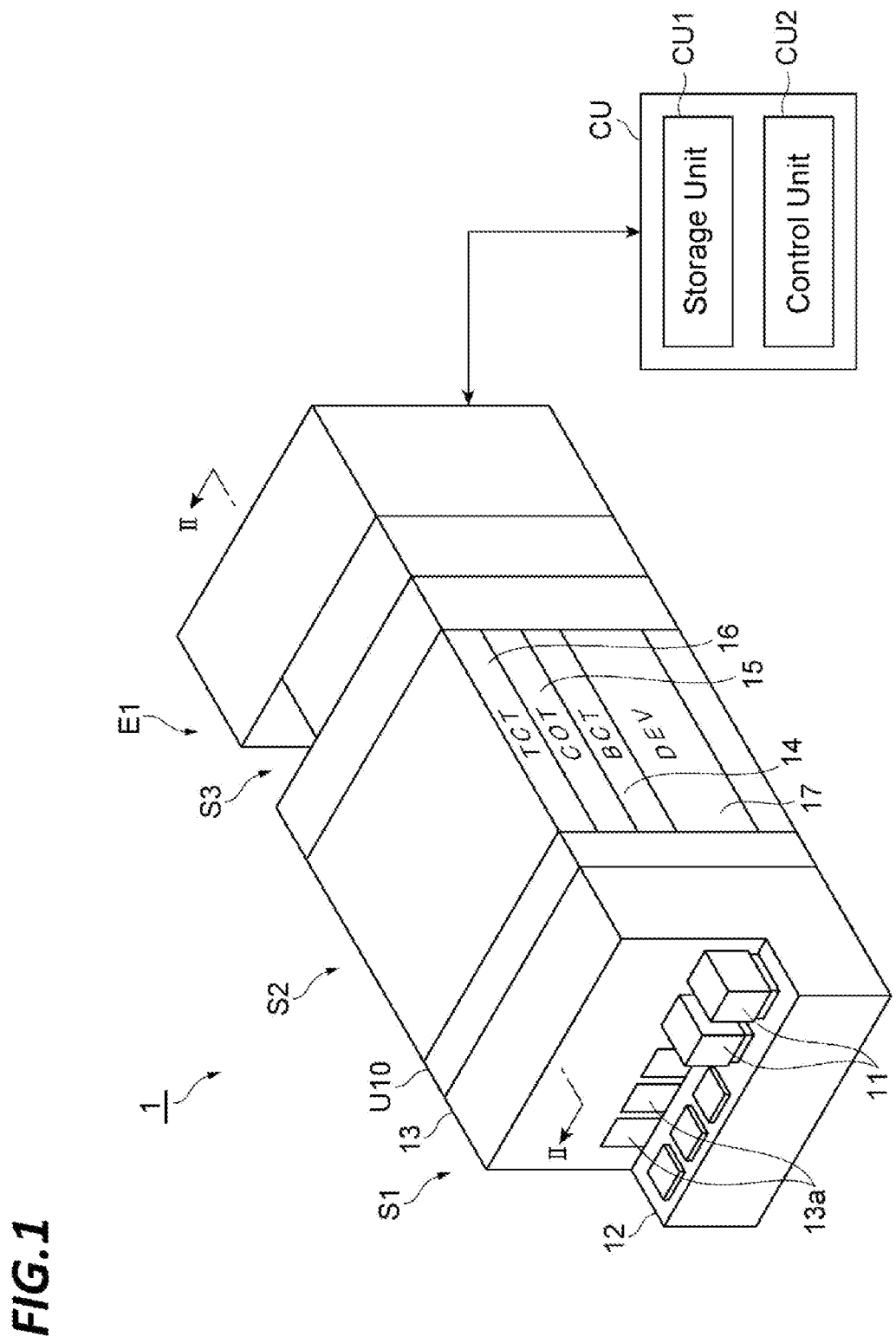
FIG. 1 is a perspective view illustrating a coating and developing system.

In the following detailed description, reference is made to the accompanying drawing, which form a part hereof. The illustrative embodiments described in the detailed description, drawing, and claims are not meant to be limiting. Other embodiments may be utilized, and other changes may be made without departing from the spirit or scope of the subject matter presented here.

However, in the processing liquid, bubbles (gases) may be included. When the processing liquid passes through the filter, the filter becomes a resistance, and the pressure at the downstream side of the filter becomes smaller than the pressure at the upstream side, and thus the gases included in the processing liquid are liberated within the filter. Accordingly, the bubbles are mixed into the filter so that the effective area of the filter is reduced and the performance of the filter is reduced. Accordingly, Japanese Patent Laid-Open Publication H7-326570 discloses a technology of discharging bubbles stored within the filter to the outside of the filter by a gas venting pipe.

However, by a gas venting pipe, it is possible to discharge relatively large bubbles within the filter to the outside of the filter, but it is hard to discharge fine bubbles (micro bubbles) to the outside of the filter.

Accordingly, an object of the present disclosure is to provide a bubble removing method, a bubble removing apparatus, a degassing apparatus of a processing liquid, and a computer-readable recording medium, in which fine bubbles are removed from a filter so as to improve the performance of the filter.

According to an aspect of the present disclosure, a method of removing bubbles includes: a first step of supplying a processing liquid into a container through a degassing nozzle having a smaller flow path area at the container side than at a supply source side of the processing liquid of a substrate so as to degas the processing liquid supplied from the supply source; a second step of supplying a degassed liquid which is the processing liquid degassed in the first step to a filter device having a filter from the container, at a first processing liquid flow rate; a third step of supplying the degassed liquid from the container to the filter device at a second processing liquid flow rate which is higher than the first processing liquid flow rate; and a fourth step of causing the degassed liquid to flow from the container to the filter device for a predetermined length of time.

In the bubble removing method according to an aspect of the present disclosure, first, in the second step, the degassed liquid is supplied from the container to the filter device at the first processing liquid flow rate, and in the third step, the degassed liquid is supplied from the container to the filter device at the second processing liquid flow rate which is higher than the first processing liquid flow rate. Accordingly, in the second step, the degassed liquid gradually permeates the filter within the filter device, and in the third step, the degassed liquid permeates almost the whole of the filter. When the filter comes in contact with the degassed liquid at a relatively high flow rate from the beginning, the degassed liquid may not permeate the whole of the filter, and large and fine bubbles may be present in the filter. However, through the second and third steps as described above, the degassed liquid gradually permeates the filter, and thus large and fine bubbles in the filter may be discharged to the outside of the filter. Further, in the bubble removing method according to an aspect of the present disclosure, in the first step, the degassed liquid is prepared by degassing the processing liquid through the degassing nozzle. The degassed liquid serves a function of collecting fine bubbles when coming in contact with the fine bubbles present in the filter. Accordingly, it is possible to more effectively discharge the fine bubbles present in the filter to the outside of the filter by using the degassed liquid. Further, in the bubble removing method according to an aspect of the present disclosure, in the fourth step, the degassed liquid is caused to flow from the container to the filter device for a predetermined length of time. Accordingly, it is possible to more effectively discharge the bubbles present in the filter to the outside of the filter by the degassed liquid. As a result, the performance of the filter may be improved. However, although the filter performance may be improved by the replacement of the filter, the system configured to eject the processing liquid to a substrate has to be stopped during the replacement, and the productivity may be reduced. However, in the bubble removing method according to an aspect of the present disclosure, the degassed liquid is caused to flow so that the performance of the filter may be improved, and there is no need to stop the system. Thus, there is almost no concern about reduction of the productivity. Also, the bubble removing method according to an aspect of the present disclosure may be employed in both a case where when the filter is used for a predetermined period, bubbles are accumulated in the filter, thereby reducing the performance of the filter, and a case where a dry filter is provided in the filter device by filter replacement. Especially, in the former case, whenever the filter performance is reduced after a predetermined time, bubbles in the filter are removed. This may reduce the number of replacements of the filter. Accordingly, the improvement of the productivity may be achieved.

The method may further include a fifth step of pressurizing an inside of the filter device after the third step and before the fourth step. In this case, the degassed liquid may more easily permeate the whole of the filter. This may further facilitate the discharge of the bubbles to the outside of the filter.

The method may further include a sixth step of discharging the processing liquid stored in the container to an outside of the container, before the first step. In this case, the processing liquid in the container may be discharged in advance so that the degassed liquid in a larger amount may be stored in the container.

The container may be a variable displacement pump. In the first step, a volume of the pump may be expanded so that the processing liquid is supplied from the supply source into the pump, and in the second to fourth steps, the volume of the pump may be contracted so that the degassed liquid is supplied from the pump into the filter device.

According to another aspect of the present disclosure, a bubble removing apparatus includes a first container configured to temporarily store a processing liquid for a substrate, the processing liquid being supplied from a supply source; a first degassing nozzle located between the supply source and the first container and including a flow path having an area which is smaller at the first container side than at the supply source side; an ejecting line configured to eject the processing liquid discharged from the first container, to the substrate; a filter device provided in the ejecting line, and including a filter, a supply discharge section configured to store, within the first container, a degassed liquid which is the processing liquid degassed by supplying the processing liquid from the supply source into the first container through the first degassing nozzle, and discharge the degassed liquid within the first container to the ejecting line, and a control unit configured to execute a control so as to cause the supply discharge section to perform a first operation of supplying the degassed liquid from the first container to the filter device at a first processing liquid flow rate, a second operation of supplying the degassed liquid from the first container to the filter device at a second processing liquid flow rate which is higher than the first processing liquid flow rate, and a third operation of causing the degassed liquid to flow from the first container to the filter device for a predetermined length of time.

In the bubble removing apparatus according to another aspect of the present disclosure, the control unit causes the supply discharge section to perform the first operation of supplying the degassed liquid from the first container to the filter device at the first processing liquid flow rate. Then, the control unit causes the supply discharge section to perform the second operation of supplying the degassed liquid from the first container to the filter device at the second processing liquid flow rate which is higher than the first processing liquid flow rate. Accordingly, the degassed liquid gradually permeates the filter within the filter device by the first operation of the supply discharge section, and then permeates almost the whole of the filter by the second operation of the supply discharge section. When the filter comes in contact with the degassed liquid at a relatively high flow rate from the beginning, the degassed liquid may not permeate the whole of the filter, and large and fine bubbles may be present in the filter. However, through the first and second operations as described above, the degassed liquid gradually permeates the filter, and thus large and fine bubbles in the filter may be discharged to the outside of the filter. Further, in the bubble removing apparatus according to another aspect of the present disclosure, the degassed liquid is prepared by degassing the processing liquid through the degassing nozzle. The degassed liquid serves a function of collecting fine bubbles when coming in contact with the fine bubbles present in the filter. Accordingly, it is possible to more effectively discharge the fine bubbles present in the filter to the outside of the filter by using the degassed liquid. In the bubble removing apparatus according to another aspect of the present disclosure, the control unit causes the supply discharge section to perform the third operation of causing the degassed liquid to flow from the first container to the filter device for a predetermined length of time. Accordingly, the bubbles in the filter may be more effectively discharged to the outside of the filter by the degassed liquid. As a result, the performance of the filter may be improved. However, although the filter performance may be improved by the replacement of the filter, the system configured to eject the processing liquid to a substrate has to be stopped during the filter replacement, and the productivity may be reduced. However, in the bubble removing apparatus according to another aspect of the present disclosure, the degassed liquid is caused to flow so that the performance of the filter may be improved, and there is no need to stop the system. Thus, there is almost no concern about reduction of the productivity. Also, the bubble removing apparatus according to another aspect of the present disclosure may be employed in both a case where when the filter is used for a predetermined period, bubbles are accumulated in the filter, thereby reducing the performance of the filter, and a case where a dry filter is provided in the filter device by filter replacement. Especially, in the former case, whenever the filter performance is reduced after a predetermined time, bubbles in the filter are removed. This may reduce the number of replacements of the filter. Accordingly, the improvement of the productivity may be achieved.

The first container may be a variable displacement pump. When causing the supply discharge section to perform the first operation, the control unit may pressurize the pump at a first pressure so as to contract a volume of the pump, and when causing the supply discharge section to perform the second and third operations, the control unit may pressurize the pump at a second pressure higher than the first pressure so as to contract the volume of the pump.

The bubble removing apparatus may further include a circulation line diverging from the ejecting line to return the processing liquid to the first container. The filter device may be provided in the ejecting line nearer to the first container side as compared to a junction of the circulation line. In this case, the circulation line diverges from the ejecting line at the downstream side of the filter device. Accordingly, there is no need to provide the filter device in both the circulation line and the ejecting line, and the number of the filter devices may be reduced.

A discharging line may be provided in the circulation line to discharge the processing liquid which flows in the circulation line. However, when a dry filter is provided in the filter device due to filter replacement, many particles are included in the filter. When the degassed liquid is circulated in the filter in the above described state, the gases and particles may be discharged from the inside of the filter, but many particles are entrained in the degassed liquid so that the degassed liquid is contaminated. However, when the discharging line is provided in the circulation line as described above, the contaminated degassed liquid may be discharged to the outside of the system without being returned to the first container.

The bubble removing apparatus may further include a second container configured to temporarily store a processing liquid for the substrate, the processing liquid being supplied from the supply source; and a second degassing nozzle located between the supply source and the second container and having a smaller flow path area at the second container side than at the supply source side. The processing liquid to be ejected to the substrate may be discharged from each of the first container and the second container to the ejecting line. The supply discharge section may store, within the second container, a degassed liquid which is the processing liquid degassed by supplying the processing liquid from the supply source into the second container through the second degassing nozzle, and discharge the degassed liquid within the second container to the ejecting line. The control unit may cause the supply discharge section to suppress the degassed liquid within the second container from being supplied to the filter device when the degassed liquid within the first container is supplied to the filter device, and to suppress the degassed liquid within the first container from being supplied to the filter device when the degassed liquid within the second container is supplied to the filter device. However, when the degassed liquid is in contact with the filter, the particles included in the filter are gradually eluted to the degassed liquid. Accordingly, when the flow of the degassed liquid stays in the filter, the concentration of particles in the degassed liquid is gradually increased. When such a degassed liquid is ejected to a substrate through the ejecting line, many particles are attached on the substrate. Thus, a defect may occur in a processed substrate. However, when the control unit operates the supply discharge section as described above, even after the ejection of the degassed liquid from the one container is completed, the degassed liquid may be ejected from the other container. Accordingly, the degassed liquid may be continuously supplied to the filter device. Accordingly, since an increase of the concentration of particles in the degassed liquid is suppressed, it is possible to suppress the possibility that a defect occurs in the substrate.

The ejecting line may diverge into a plurality of sub-lines.

The ejecting line may diverge into a plurality of sub-lines at a downstream side of the filter device. In this case, the degassed liquid which has passed through the filter is caused to flow in the plurality of sub-lines.

According to a further aspect of the present disclosure, a degassing apparatus includes a variable displacement pump configured to temporarily store a processing liquid for a substrate, the processing liquid being supplied from a supply source; a degassing nozzle located between the supply source and the pump and having a smaller flow path area at the pump side than at the supply source side; an ejecting line configured to eject the processing liquid discharged from the pump, to the substrate; and a supply discharge section configured store, within the pump, a degassed liquid which is the processing liquid degassed by supplying the processing liquid from the supply source into the pump through the degassing nozzle, and discharge the degassed liquid within the pump to the ejecting line. The supply discharge section selectively applies a first pressure or a second pressure lower than the first pressure to the pump while the processing liquid is supplied from the supply source into the pump through the degassing nozzle.

In the degassing apparatus according to a further aspect of the present disclosure, the supply discharge section selectively applies the first pressure or the second pressure lower than the first pressure to the pump so that the volume of the pump is expanded while supplying the processing liquid from the supply source into the pump through the degassing nozzle. Accordingly, when the pump is decompressed based on the second pressure, the pump is more forcibly acted, and the processing liquid is drawn into the pump at a higher flow velocity as compared to a case where the first pressure is selected. Accordingly, the pressure of the processing liquid is further reduced, and the gases mixed in the processing liquid are removed in a larger amount from the processing liquid so that the highly degassed liquid is prepared. As a result, the highly degassed liquid may permeate the filter so that fine bubbles present in the filter may be more effectively collected. Accordingly, the performance of the filter may be improved.

The degassing apparatus may further include a case configured to accommodate the pump. The supply discharge section may include an ejector in which a fluid is selectively circulated from an inlet side toward an outlet side, at a first ejector flow rate or a second ejector flow rate lower than the first ejector flow rate, and a pipe configured to fluidly connect a space between the case and an outer surface of the pump, to an intermediate portion between the inlet and the outlet in the ejector. In this case, when the fluid flows from the inlet side of the ejector toward the outlet side at the second ejector flow rate, a lower pressure is applied to the pump as compared to a case where the fluid flows from the inlet side of the ejector toward the outlet side at the first ejector flow rate. Accordingly, when the fluid is caused to flow in the ejector at the second ejector flow rate, the pump is more forcibly acted, and the processing liquid is drawn into the pump at a higher flow velocity as compared to a case where the fluid is caused to flow in the ejector at the first ejector flow rate. As a result, gases mixed in the processing liquid are removed in a larger amount from the processing liquid so that the highly degassed liquid is prepared.

According to a still further aspect of the present disclosure, a computer-readable recording medium has a program recorded therein to execute the bubble removing method as described above in the bubble removing apparatus. In the present specification, the computer-readable recording medium includes a non-temporary type medium (a non-transitory computer recording medium) (e.g., various main or auxiliary storage devices), or propagation signals (a transitory computer recording medium) (e.g., data signals which may be provided via a network).

According to the present disclosure, there are provided a bubble removing method, a bubble removing apparatus, a degassing apparatus, and a computer-readable recording medium, in which fine bubbles are removed from a filter so as to improve the performance of the filter.

The exemplary embodiments of the present disclosure will be described with reference to drawings. However, the following exemplary embodiments are examples for describing the present disclosure, and the following description is not intended to limit the present disclosure. In the description, the same elements or the elements having the same function are given the same reference numerals, and redundant descriptions thereof will be omitted.

(Configuration of Coating and Developing Apparatus)

First, an outline of a configuration of a coating and developing apparatus 1 illustrated in FIGS. 1 to 3 will be described. The coating and developing apparatus 1 performs a processing of applying a resist material on a surface of a wafer (substrate) W to form a resist film before exposure is performed by an exposure device E1. The coating and developing apparatus 1 performs a processing of developing the resist film formed on the surface of the wafer W after the exposure is performed by the exposure device E1. In the present exemplary embodiment, the wafer W is formed in a disk shape, but a circular wafer having a partially cut-out portion, or a wafer formed in a shape other than a circle, such as a polygonal shape, may be used.

Figure 2:
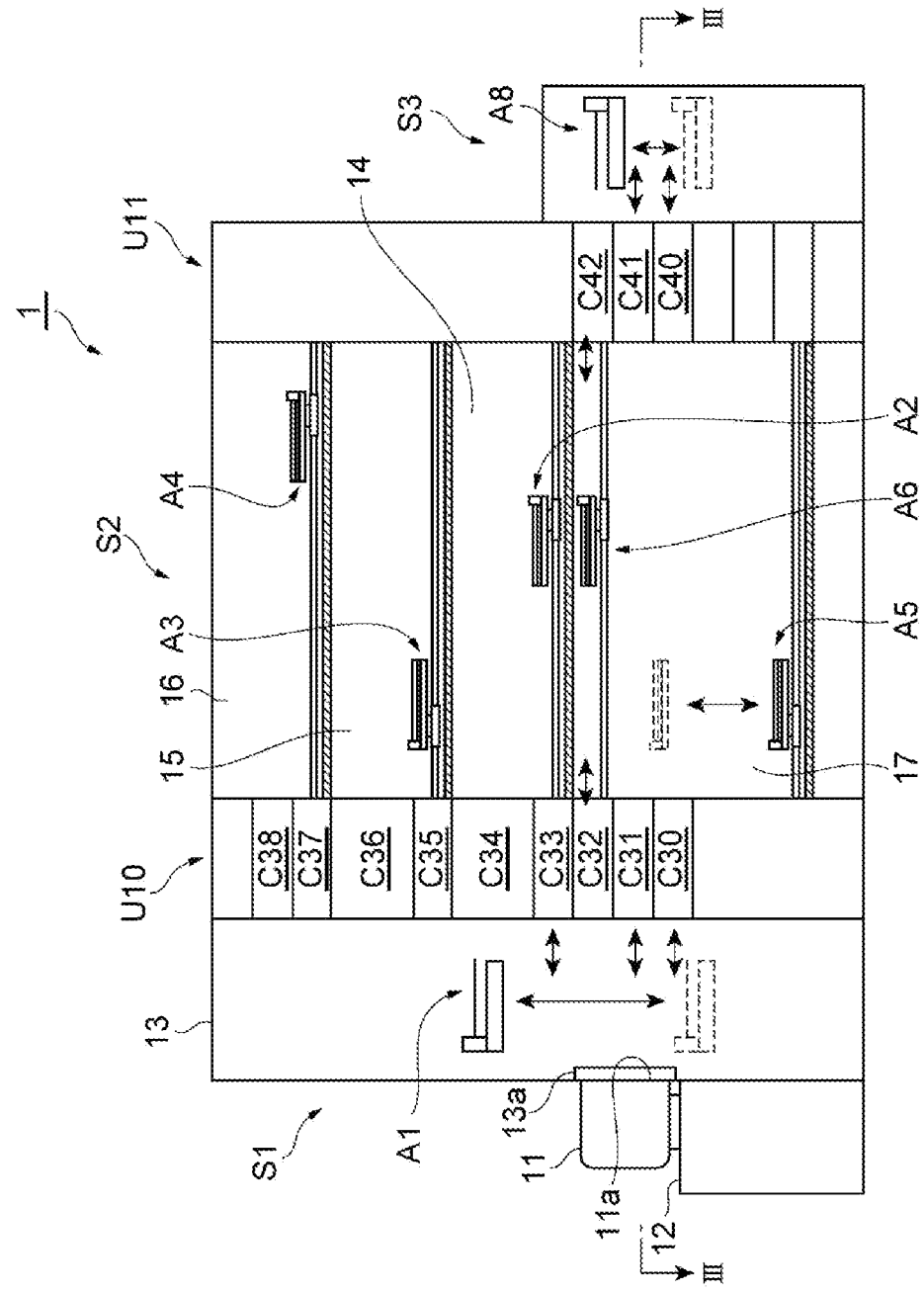
FIG. 2 is a cross-sectional view of FIG. 1 taken along line II-II.

As illustrated in FIGS. 1 and 2, the coating and developing apparatus 1 includes a carrier block S1, a processing block S2, an interface block S3, and a control device CU serving as a control unit of the coating and developing apparatus 1. In the present exemplary embodiment, the carrier block S1, the processing block S2, the interface block S3, and the exposure device E1 are arranged in series in this order.

Figure 3:
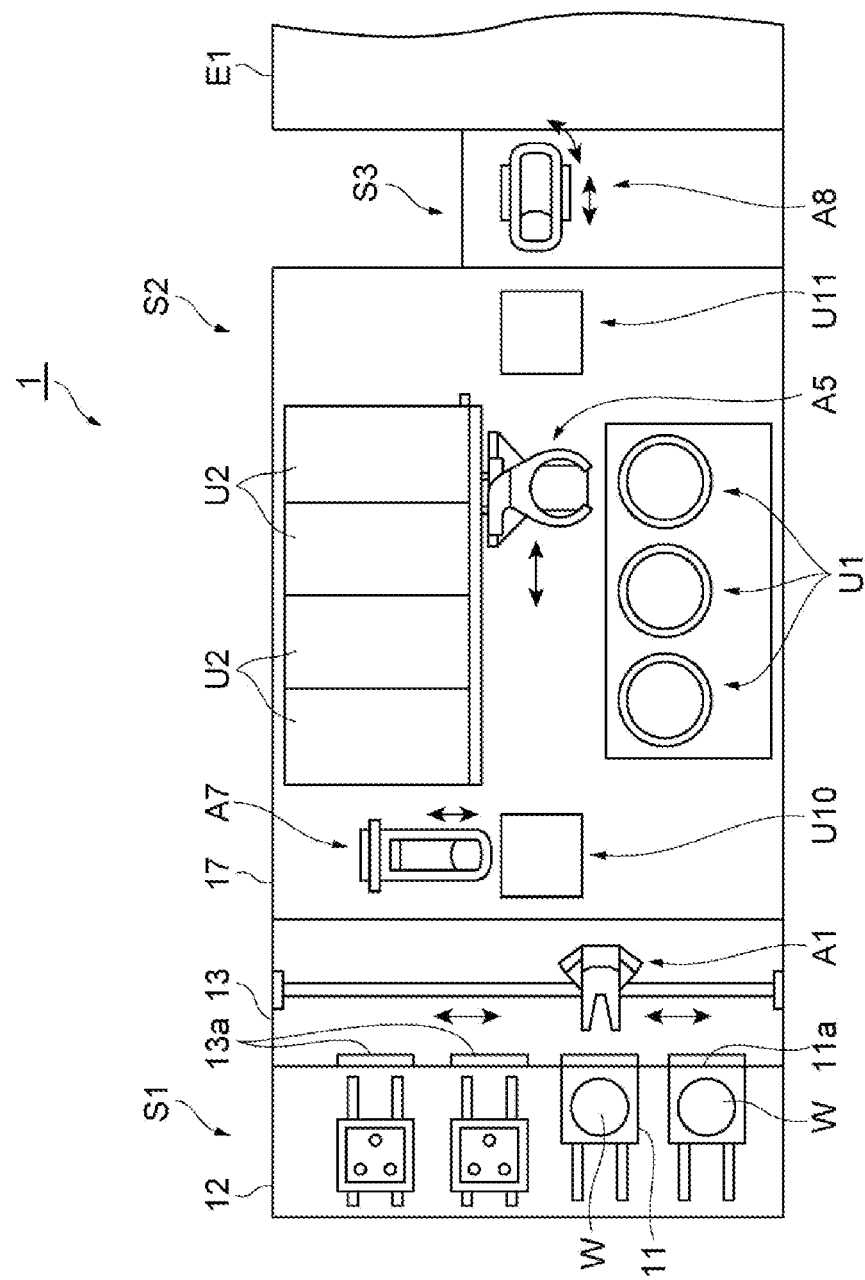
FIG. 3 is a cross-sectional view of FIG. 2 taken along line III-III.

As illustrated in FIGS. 1 and 3, the carrier block S1 includes a carrier station 12, and a carry-in/out section 13. The carrier station 12 supports a plurality of carriers 11. Each of the carriers 11 accommodates a plurality of wafers W in a sealed state. The carrier 11 includes an opening/closing door (not illustrated) for loading and unloading the wafers W at one side surface 11a side. The carrier 11 is detachably provided on the carrier station 12 so that the side surface 11a faces the carry-in/out section 13 side.

As illustrated in FIGS. 1 to 3, the carry-in/out section 13 includes opening/closing doors 13a which correspond to the plurality of carriers 11 on the carrier station 12, respectively. When the opening/closing door of the side surface 11a and the opening/closing door 13a of the carry-in/out section 13 are opened simultaneously, the inside of the carrier 11 and the inside of the carry-in/out section 13 are communicated with each other. As illustrated in FIGS. 2 and 3, the carry-in/out section 13 includes an exchange arm A1 provided therein. The exchange arm A1 takes wafers W out of the carriers 11 and transfers the wafers W to the processing block S2. The exchange arm A1 receives wafers W from the processing block S2 and returns the wafers W into the carriers 11.

As illustrated in FIGS. 1 to 3, the processing block S2 is positioned adjacent to and connected to the carrier block S1. As illustrated in FIGS. 1 and 2, the processing block S2 a bottom anti-reflection film forming (BCT) block 14, a resist film forming (COT) block 15, a top anti-reflection film forming (TCT) block 16, a developing (DEV) block 17. The DEV block 17, the BCT block 14, the COT block 15, and the TCT block 16 are arranged in this order from the bottom surface side.

As illustrated in FIG. 2, the BCT block 14 includes a coating unit (not illustrated), a heating/cooling unit (not illustrated), and a conveyance arm A2 configured to convey a wafer W to these units. The coating unit and the heating/cooling unit are provided within the BCT block 14. The coating unit applies a processing liquid for forming an anti-reflection film on the surface of the wafer W. The heating/cooling unit heats the wafer W by, for example, a heating plate, and then cools the wafer W by, for example, a cooling plate. In this manner, a bottom anti-reflection film is formed on the surface of the wafer W.

As illustrated in FIG. 2, the COT block 15 includes a coating unit (not illustrated), a heating/cooling unit (not illustrated), and a conveyance arm A3 configured to convey the wafer W to these units. The coating unit and the heating/cooling unit are provided within the COT block 15. The coating unit applies a processing liquid (resist material) for forming a resist film on the bottom anti-reflection film. The heating/cooling unit heats the wafer W by, for example, a heating plate, and then cools the wafer W by, for example, a cooling plate. In this manner, a resist film is formed on the bottom anti-reflection film of the wafer W. The resist material may be a positive-type material or a negative-type material.

As illustrated in FIG. 2, the TCT block 16 includes a coating unit (not illustrated), a heating/cooling unit (not illustrated), and a conveyance arm A4 configured to convey the wafer W to these units. The coating unit and the heating/cooling unit are provided within the TCT block 16. The coating unit applies a processing liquid for forming an anti-reflection film on the resist film. The heating/cooling unit heats the wafer W by, for example, a heating plate, and then cools the wafer W by, for example, a cooling plate. In this manner, a top anti-reflection film is formed on the resist film of the wafer W.

As illustrated in FIGS. 2 and 3, the DEV block 17 includes a plurality of developing units (substrate processing apparatus) U1, a plurality of heating/cooling units (heat treating units) U2, a conveyance arm A5 configured to convey the wafer W to the units, and a conveyance arm A6 configured to convey the wafer W between the front and rear sides of the processing block S2 without passing by these units. The developing units U1 and the heating/cooling units U2 are provided within the DEV block 17.

As described below, each of the developing units U1 performs a processing of developing an exposed resist film. Each of the heating/cooling units U2 heats the resist film on the wafer W by heating the wafer W through, for example, a heating plate. The heating/cooling unit U2 cools a heated wafer W by, for example, a cooling plate. The heating/cooling unit U2 performs a heating processing such as, for example, post exposure baking (PEB), and post baking (PB). The PEB is a processing of heating a resist film before the developing processing. The PB is a processing of heating a resist film after the developing processing.

As illustrated in FIGS. 1 to 3, a shelf unit U10 is provided in the processing block S2 at the carrier block S1 side. The shelf unit U10 includes a plurality of cells C30 to C38. The cells C30 to C38 are arranged vertically between the DEV block 17 and the TCT block 16. A lift arm A7 is provided in the vicinity of the shelf unit U10. The lift arm A7 conveys wafers W between the cells C30 to C38.

A shelf unit U11 is provided in the processing block S2 at the interface block S3 side. The shelf unit U11 includes a plurality of cells C40 to C42. The cells C40 to C42 are disposed adjacent to the DEV block 17 and arranged vertically.

As illustrated in FIGS. 1 to 3, the interface block S3 is located between the processing block S2 and the exposure device E1, and is connected to each of the processing block S2 and the exposure device E1. As illustrated in FIGS. 2 and 3, the interface block S3 includes an exchange arm A8 provided therein. The exchange arm A8 transfers wafers W from the shelf unit U11 of the processing block S2 to the exposure device E1. The exchange arm A8 receives wafers W from the exposure device E1 and returns the wafers W to the shelf unit U11.

The control device CU is a computer for controlling, and includes a storage unit CU1, and a control unit CU2, as illustrated in FIG. 1. The storage unit CU1 stores a program for operating respective units of the coating and developing apparatus 1 or respective units of the exposure device E1. The storage unit CU1 is, for example, a semiconductor memory, an optical recording disk, a magnetic recording disk, or a magneto-optical recording disk. The program may be included in an external storage device as a separate member from the storage unit CU1, or an intangible medium such as, for example, propagation signals. The program may be installed to the storage unit CU1 from other media as described above, and stored in the storage unit CU1. The control unit CU2 controls the operations of respective units of the coating and developing apparatus 1 or respective units of the exposure device E1, based on the program read out from the storage unit CU1. The control device CU may further include a display unit (not illustrated) configured to display a processing condition setting screen, or an input unit (not illustrated) which allows an operator to input processing conditions. The control device CU may operate the respective units of the coating and developing apparatus 1 or the respective units of the exposure device E1 according to the conditions input through the input unit.

(Operation of Coating and Developing Apparatus 1)

Hereinafter, an outline of an operation of the coating and developing apparatus 1 will be described. First, the carriers 11 are provided on the carrier station 12. Here, one side surface 11a of each of the carriers 11 faces one of the opening/closing doors 13a of the carry-in/out section 13. Subsequently, when both the opening/closing door of the carrier 11 and the opening/closing door 13a of the carry-in/out section 13 are opened, wafers W within the carrier 11 are taken out by the exchange arm A1 and are sequentially conveyed to any one of cells in the shelf unit U10 of the processing block S2.

After the wafers W are conveyed to any one of cells in the shelf unit U10 by the exchange arm A1, the wafers W are sequentially conveyed to the cell C33 corresponding to the BCT block 14 by the lift arm A7. The wafers W conveyed to the cell C33 are conveyed to respective units within the BCT block 14 by the conveyance arm A2. While the wafers W are conveyed into the BCT block 14 by the conveyance arm A2, a bottom anti-reflection film is formed on the surfaces of the wafers W.

The wafers W formed with the bottom anti-reflection film are conveyed to the cell C34 on top of the cell C33 by the conveyance arm A2. The wafers W conveyed to the cell C34 are conveyed to the cell C35 corresponding to the COT block 15 by the lift arm A7. The wafers W conveyed to the cell C35 are conveyed to respective units within the COT block 15 by the conveyance arm A3. While the wafers W are conveyed into the COT block 15 by the conveyance arm A3, a resist film is formed on the bottom anti-reflection film of each of the wafers W.

The wafers W formed with the resist film are conveyed to the cell C36 on top of the cell C35 by the conveyance arm A3. The wafers W conveyed to the cell C36 are conveyed to the cell C37 corresponding to the TCT block 16 by the lift arm A7. The wafers W conveyed to the cell C37 are conveyed to respective units within the TCT block 16 by the conveyance arm A4. While the wafers W are conveyed into the TCT block 16 by the conveyance arm A4, a top anti-reflection film is formed on the resist film of each of the wafers W.

The wafers W formed with the top anti-reflection film are conveyed to the cell C38 on top of the cell C37 by the conveyance arm A4. The wafers W conveyed to the cell C38 are conveyed to the cell C32 by the lift arm A7, and conveyed to the cell C42 of the shelf unit U11 by the conveyance arm A6. The wafers W conveyed to the cell C42 are delivered to the exposure device E1 by the exchange arm A8 of the interface block S3, and the resist film is exposed in the exposure device E1. The exposed wafers W are conveyed to each of the cells C40 and C41 under the cell C42 by the exchange arm A8.

The wafers W conveyed to each of the cells C40 and C41 are conveyed to respective units within the DEV block 17 by the conveyance arm A5, and developed. Accordingly, a resist pattern (uneven pattern) is formed on the surface of each of the wafers W. The wafers W formed with the resist pattern are conveyed to each of the cells C30 and C31 corresponding to the DEV block 17 in the shelf unit U10 by the conveyance arm A5. The wafers W conveyed to each of the cells C30 and C31 are conveyed by the lift arm A7 to a cell which is accessible by the exchange arm A1, and are returned into the carrier 11 by the exchange arm A1.

The above-described configuration and operation of the coating and developing apparatus 1 are merely an example.

The coating and developing apparatus 1 may only include a liquid processing unit such as, for example, a coating unit or a developing unit, a pre-processing unit/post-processing unit such as, for example, a heating/cooling unit, and a conveyance device. That is, the number, the kinds, and the lay-out of these respective units may be properly varied.

(Configuration of Developing Unit)

Figure 4:
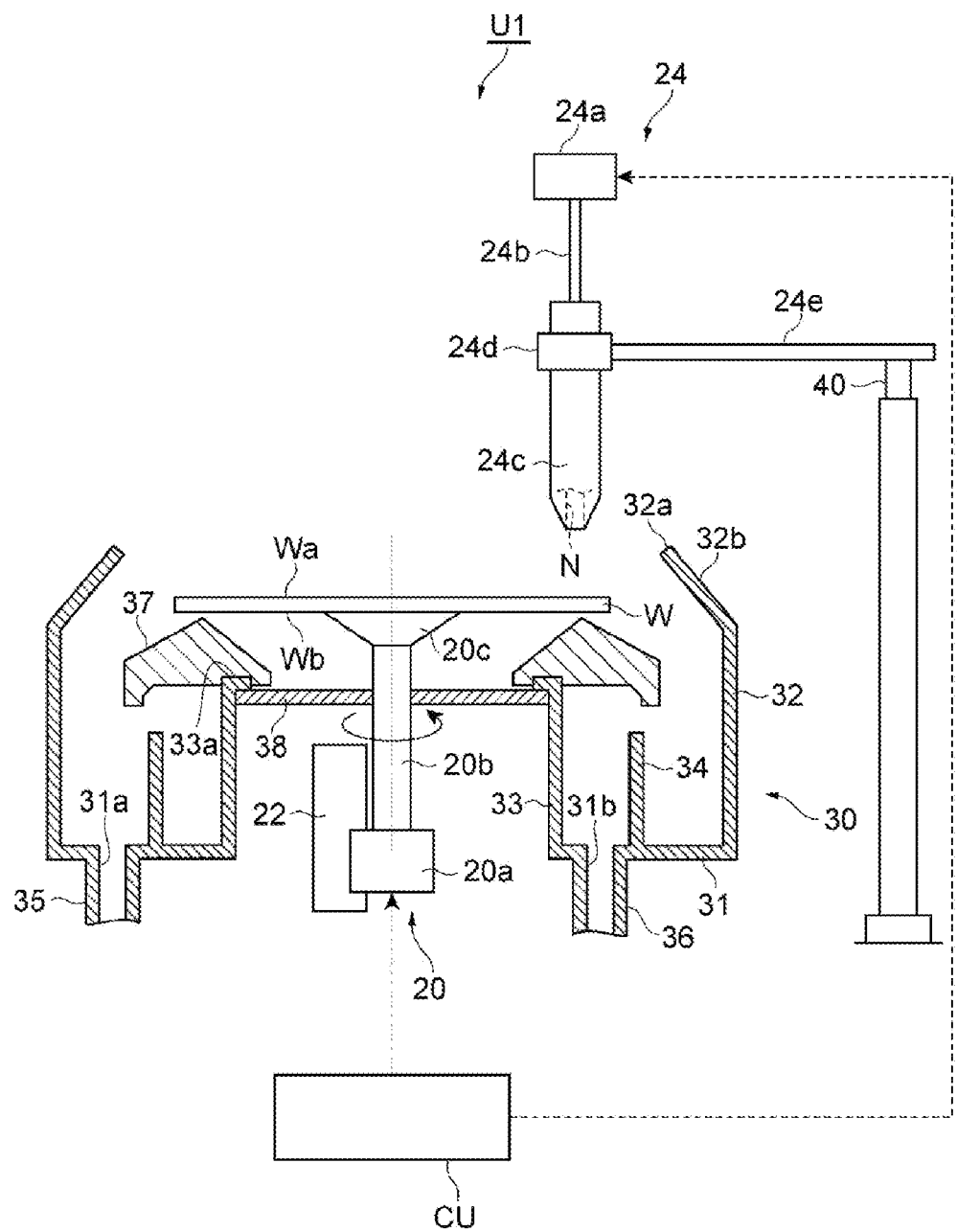
FIG. 4 is a cross-sectional view illustrating a substrate processing apparatus.

Hereinafter, the developing unit (substrate processing apparatus) U1 will be described in more detail. As illustrated in FIG. 4, the developing unit U1 includes a rotary holding unit 20, a lift device 22, and a processing liquid supply unit 24.

The rotary holding unit 20 includes a main body 20a having a power source (such as an electric motor) provided therein, a rotary shaft 20b extending vertically from the main body 20a, and a chuck 20c provided at the tip end of the rotary shaft 20b. The main body 20a rotates the rotary shaft 20b and the chuck 20c by the power source. The chuck 20c supports the central portion of a wafer W and substantially horizontally holds the wafer W by, for example, suction. That is, the rotary holding unit 20 rotates the wafer W around the central axis (the vertical axis) perpendicular to the surface of the wafer W, while the posture of the wafer W is placed in a substantially horizontal state. In the present exemplary embodiment, the rotary holding unit 20 rotates the wafer W counterclockwise when viewed from the top side, as illustrated in FIG. 4.

The lift device 22 is attached to the rotary holding unit 20 to move up and down the rotary holding unit 20. Specifically, the lift device 22 moves up and down the rotary holding unit 20 (the chuck 20c) between a raised position (an exchange position) for exchanging wafers W between the conveyance arm A5 and the chuck 20c, and a lowered position (a developing position) for performing a developing processing.

A cup 30 is provided around the rotary holding unit 20. When the wafer W is rotated, the processing liquid supplied to the surface of the wafer W is shaken off and dropped in the surrounding portion. Here, the cup 30 serves as a container for receiving the dropped processing liquid. The cup 30 includes an annular bottom plate 31 which surrounds the rotary holding unit 20, a cylindrical outer wall 32 which protrudes vertically upwardly from the outer periphery of the bottom plate 31, and a cylindrical inner wall 33 which protrudes vertically upwardly from the inner periphery of the bottom plate 31.

The whole of the outer wall 32 is located outside the wafer W held by the chuck 20c. An upper end 32a of the outer wall 32 is located above the wafer W held by the rotary holding unit 20 at the lowered position. The portion of the outer wall 32 at the upper end 32a side is formed as a slope wall portion 32b which is inclined inwardly toward the top side. The whole of the inner wall 33 is located inside the outer periphery of the wafer W held by the chuck 20c. An upper end 33a of the inner wall 33 is located below the wafer W held by the rotary holding unit 20 at the lowered position.

A partition wall 34 protruding vertically upwardly from the top surface of the bottom plate 31 is provided between the inner wall 33 and the outer wall 32. That is, the partition wall 34 surrounds the inner wall 33. A liquid discharge port 31a is formed in a portion of the bottom plate 31 between the outer wall 32 and the partition wall 34. A drain tube 35 is connected to the liquid discharge port 31a. A gas discharge port 31b is formed in a portion of the bottom plate 31 between the partition wall 34 and the inner wall 33. An exhaust tube 36 is connected to the gas discharge port 31b.

An umbrella-like portion 37 protruding to the outside of the partition wall 34 is provided on the top of the inner wall 33. The processing liquid which is scattered outward and dropped from the wafer W is guided to a gap between the outer wall 32 and the partition wall 34 and discharged from the liquid discharge port 31a. For example, a gas generated from the processing liquid enters a gap between the partition wall 34 and the inner wall 33, and is discharged from the gas discharge port 31b.

A partition plate 38 closes the top of the space surrounded by the inner wall 33. The main body 20a of the rotary holding unit 20 is located below the partition plate 38. The chuck 20c is located above the partition plate 38. The rotary shaft 20b is inserted into a through hole formed in the central portion of the partition plate 38.

Figure 5:
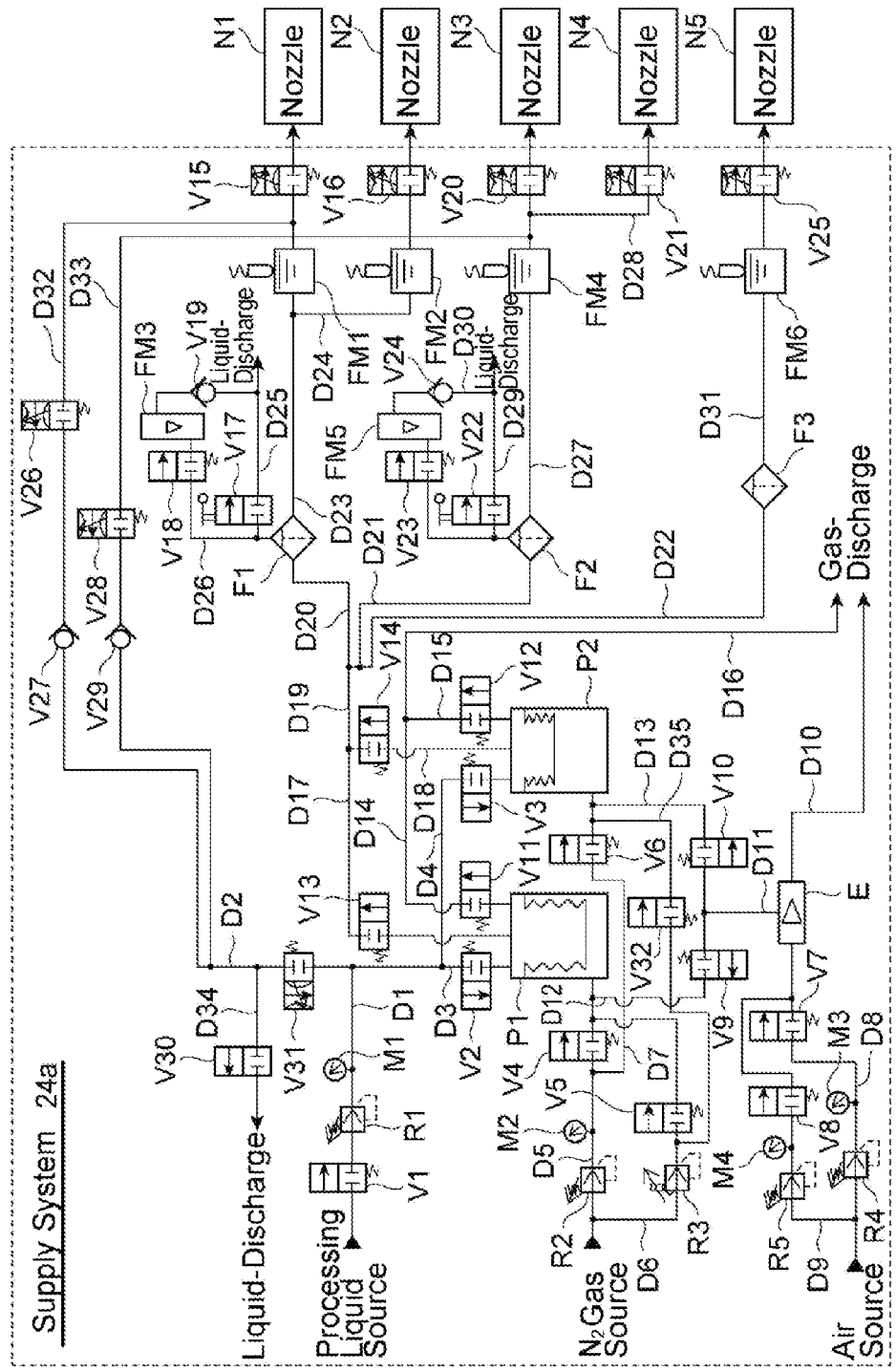
FIG. 5 is a view illustrating a liquid supply system.

As illustrated in FIGS. 4 and 5, the processing liquid supply unit 24 includes a supply system 24a of a processing liquid (which will be specifically described below), a processing liquid head 24c, and a moving body 24d. The processing liquid head 24c is connected to the supply system 24a via a supply tube 24b. The processing liquid head 24c ejects the processing liquid supplied from the supply system 24a by a control signal received from the control device CU, through a nozzle N to a surface Wa of the wafer W. The nozzle N is opened downward toward the surface Wa of the wafer W. In the present exemplary embodiment, the processing liquid is supplied to each of a plurality of nozzles N1 to N5 from the supply system 24a (see FIG. 5). As specifically described later, filter devices F1 and F2 and a circulation line are provided at the upstream side of the nozzles N1 to N4, and thus the processing liquids ejected from the nozzles N1 to N4 are relatively clean liquids from which particles are removed by the filter devices F1 and F2. Thus, the processing liquids are ejected toward the surface Wa of the wafer W from the nozzles N1 to N4 to process the surface Wa. Meanwhile, a filter device F3 is provided but no circulation line is present at the upstream side of the nozzle N5. Thus, a filter maintenance mode (which will be described later) is not applied to the filter device F3, and the processing liquid ejected from the nozzle N5 is a relatively polluted liquid. Thus, the processing liquid ejected from the nozzle N5 is used in applications other than the processing of the surface Wa of the wafer W. The processing liquid may be, for example, a resist liquid, a thinner liquid, a developing liquid, a rinsing liquid, or pure water.

The moving body 24d is connected to the processing liquid head 24c through an arm 24e. The moving body 24d receives a control signal from the control device CU, and moves on a guide rail 40 horizontally extending at the outside of the outer wall 32 to horizontally move the processing liquid head 24c. Accordingly, the processing liquid head 24c moves to a position above the wafer W at the lowered position, and on a straight line perpendicular to the central axis of the wafer W, along the radial direction of the wafer W.

(Configuration of Supply System)

Hereinafter, the supply system (a bubble removing apparatus or a degassing apparatus) 24a will be described in detail. As illustrated in FIG. 5, the supply system 24a includes pump devices P1, and P2, the filter devices F1 to F3, pipes D1 to D35, valves V1 to V32, regulators R1 to R5, an ejector E, flowmeters FM1 to FM6, and pressure gauges M1 to M4.

The pump devices P1 and P2 are configured to temporarily store a processing liquid so that the processing liquid is supplied to the processing liquid head 24c and ejected from the nozzles N. The configurations of the pump devices P1 and P2 are the same in the present exemplary embodiment. Thus, hereinafter, the configuration of the pump device P1 will be described, and the descriptions on the configuration of the pump device P2 will be omitted.

Figure 6A:
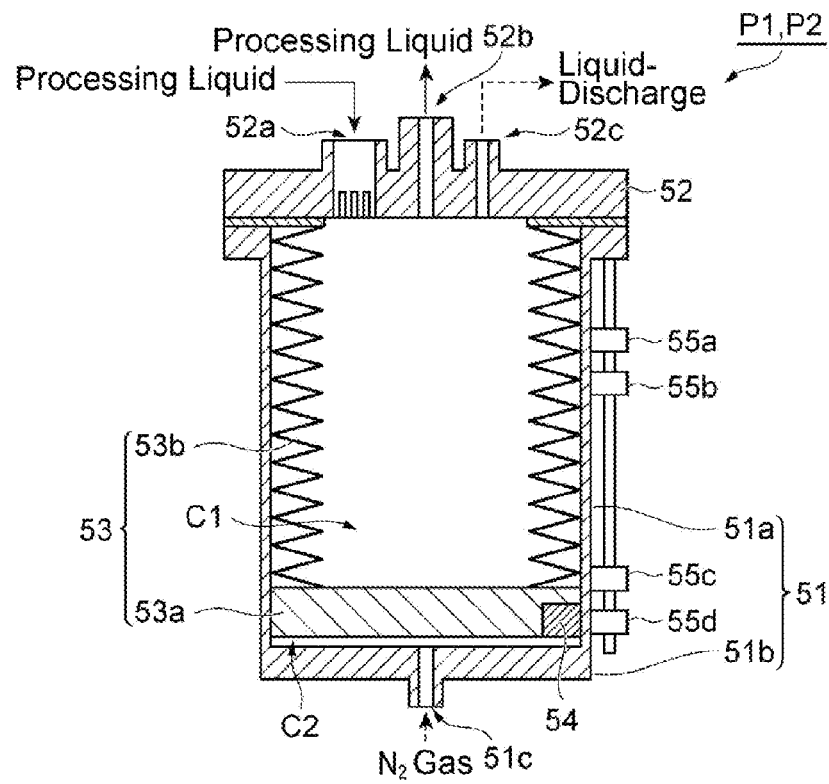
FIGS. 6A and 6B are cross-sectional views illustrating a bellows pump.
Figure 6B:
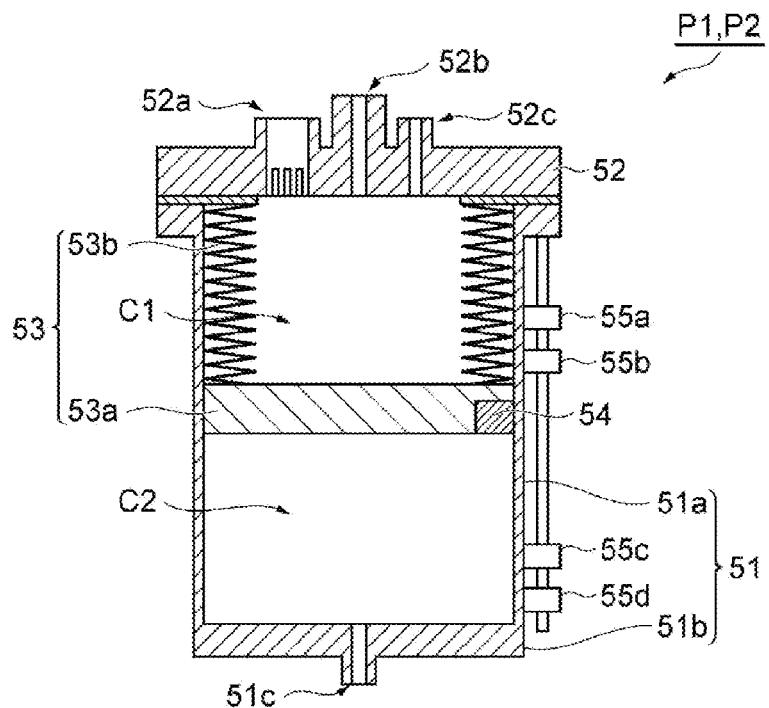

As illustrated in FIGS. 6A and 6B, the pump device P1 includes a case 51 having a bottom cylindrical shape, a cover 52 disposed at the opened end of the case 51, a bellows pump 53 disposed within the case 51, a magnet 54, sensors 55a to 55d. The case 51 includes a cylindrical side wall 51a, and a bottom wall 51b configured to close the bottom portion of the side wall 51a. A connection port 51c is formed in the bottom wall 51b to penetrate the bottom wall 51b. The connection port 51c is connected to a $N_2$ gas source through the pipes D5, D6, D7, D12, D13, and D35 in order to introduce and discharge $N_2$ gas.

The cover 52 closes the opening side of the case 51, and defines a space for accommodating the bellows pump 53, together with the case 51. In the cover 52, each of a degassing nozzle 52a, an outlet port 52b, and a drain port 52c is formed to penetrate the cover 52.

The degassing nozzle 52a is connected to a processing liquid source through the pipes D1, D2, D3 and D4 in order to introduce the processing liquid into the bellows pump 53. In the present exemplary embodiment, the degassing nozzle 52a is formed in the cover 52. However, the degassing nozzle 52a may be disposed between the processing liquid source and the pump device P1 (which will be referred to as a processing liquid chamber C1). In the degassing nozzle 52a, a flow path area at the bellows pump 53 side (outlet side) is set to be smaller than a flow path area at the processing liquid source side (inlet side). Assuming that the energy conservation law is applied to the processing liquid which flows from the inlet side to the outlet side of the degassing nozzle 52a, in a case where the processing liquid at a constant flow rate flows in the degassing nozzle 52a from the inlet side to the outlet side, the flow velocity of the processing liquid flowing at the outlet side having a small flow path area is larger than the flow velocity of the processing liquid flowing at the inlet side having a large flow path area based on a continuity equation. Then, based on Bernoulli's theorem, the pressure of the processing liquid flowing in the degassing nozzle 52a at the outlet side is reduced. As a result, gases dissolved in the processing liquid are degassed from the processing liquid. Accordingly, a degassed liquid which is the processing liquid degassed by the degassing nozzle 52a, and gases separated from the processing liquid by degassing are introduced into the bellows pump 53. Hereinafter, the degassed liquid may be simply referred to as a "processing liquid."

The outlet port 52b is connected to the nozzles N via the pipes D17 to D24, D27, D28 and D31 so that the processing liquid is discharged to the outside of the bellows pump 53 and ejected from the nozzles N. The drain port 52c is connected to the outside of the system via the pipes D14 to D16 so that a part of the degassed liquid, together with the gases separated from the processing liquid by the degassing, is discharged to the outside of the bellows pump 53.

The bellows pump 53 includes a piston plate 53a, and a bellows (a bellows member) 53b. The piston plate 53a has a shape corresponding to the inner wall surface of the side wall 51a, and is capable of reciprocating along the extension direction of the side wall 51a within the case 51. The bellows 53b is capable of expanding and contracting along the extension direction of the side wall 51a within the case 51. One end of the bellows 53b is attached to one surface of the cover 52 which faces the bottom wall 51b. The other end of the bellows 53b is attached to one surface of the piston plate 53a which faces the cover 52. Accordingly, the volume of the bellows pump 53 is changed depending on the position of the piston plate 53a. That is, the bellows pump 53 is a variable displacement pump.

A space surrounded by the cover 52, the bellows 53b, and the piston plate 53a defines the processing liquid chamber C1 configured to store the processing liquid. That is, the size of the processing liquid chamber C1 indicates the volume of the bellows pump 53. A space surrounded by the case 51 and the piston plate 53a defines a gas chamber C2 into and from which the $N_2$ gas is introduced and discharged.

A magnet 54 is attached to the outer periphery of the piston plate 53a. The sensors 55a to 55d detect a magnetic field of the magnet 54 to detect the position of the piston plate 53a. The sensors 55a to 55d are disposed on the outer surface of the side wall 51a so as to face the magnet 54 through the side wall 51a. The sensors 55a to 55d are disposed to be arranged in this order from the cover 52 side to the bottom wall 51b side.

The sensor 55a is located nearest to the cover 52 to detect an empty state of the inside of the bellows pump 53 (the processing liquid chamber C1). The sensor 55b is located nearer to the bottom wall 51b, compared to the sensor 55a, and is located nearer to the cover 52, compared to the sensor 55c to detect a substantially empty (Pre Empty) state of the inside of the bellows pump 53 (the processing liquid chamber C1). The sensor 55c is located nearer to the bottom wall 51b, compared to the sensor 55b, and is located nearer to the cover 52, compared to the sensor 55d, to detect a state where the inside of the bellows pump 53 (the processing liquid chamber C1) is nearly filled with the processing liquid (Pre Full state). The sensor 55d is located nearest to the bottom wall 51b to detect a state where the inside of the bellows pump 53 (the processing liquid chamber C1) is filled with the processing liquid (Full state).

The filter devices F1 to F3 are configured to remove foreign matters such as, for example, particles, included in the processing liquid. The configurations of the filter devices F1 to F3 are the same in the present exemplary embodiment. Thus, hereinafter, the configuration of the filter device F1 will be described, and the descriptions on the configurations of the filter devices F2 and F3 will be omitted.

Figure 7:
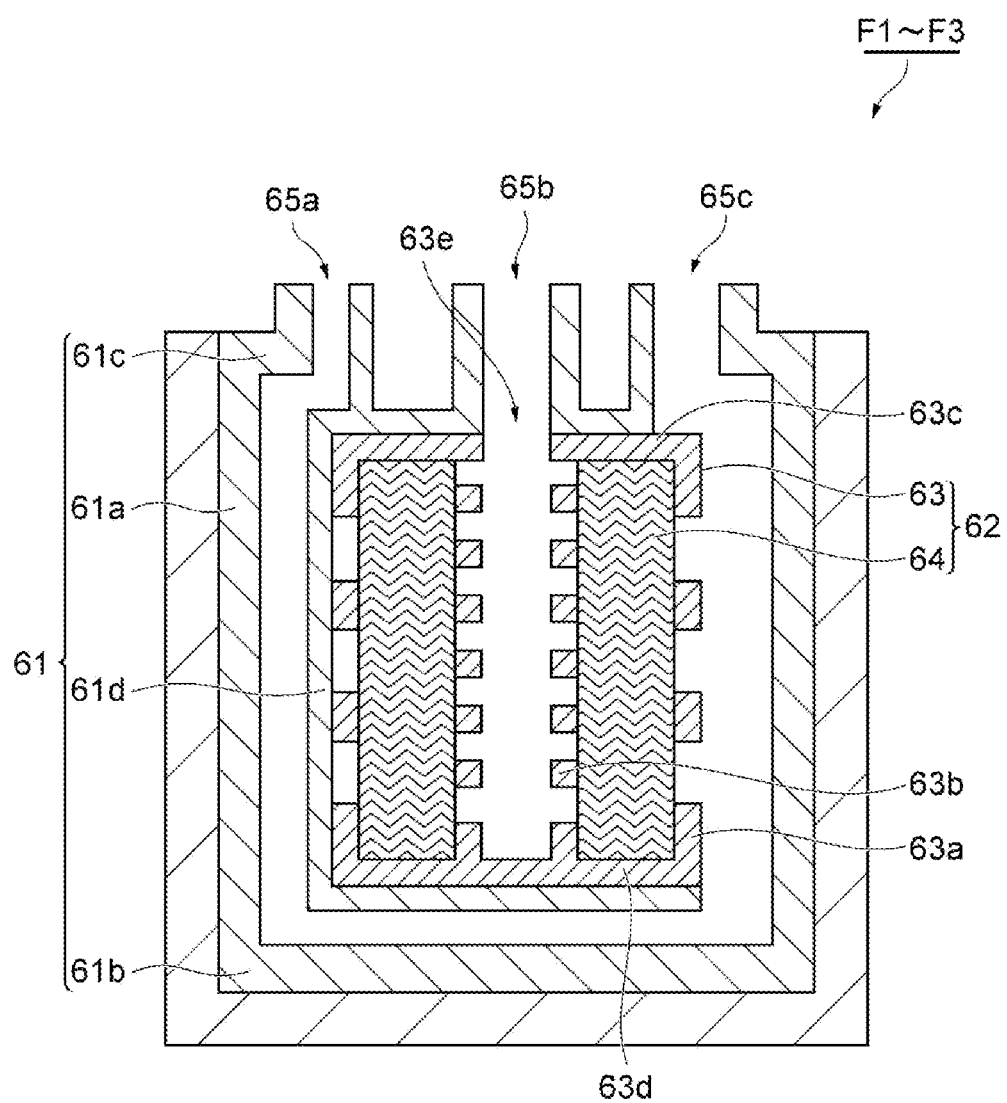
FIG. 7 is a cross-sectional view illustrating a filter unit.

As illustrated in FIG. 7, the filter device F1 includes a cylindrical case 61, and a filter 62. The case 61 includes a cylindrical side wall 61a, a bottom wall 61b which closes the bottom portion of the side wall 61a, a top wall 61c disposed at the top of the side wall 61a, and a filter support 61d disposed within the space formed by the side wall 61a, the bottom wall 61b and the top wall 61c.

The filter 62 includes a filter container 63, and a filter main body 64. The filter 62 is attached to the filter support 61d. Accordingly, the filter 62 is held within the case 61.

The filter container 63 includes a cylindrical outer wall 63a, a cylindrical inner wall 63b, a top wall 63c disposed at one end side of the outer wall 63a and the inner wall 63b, and a bottom wall 63d disposed at the other end side of the outer wall 63a and the inner wall 63b.

The inner wall 63b is disposed inside the outer wall 63a to be substantially coaxial with the outer wall 63a. A plurality of through holes is formed in the outer wall 63a and the inner wall 63b to allow the processing liquid to pass in and out of the filter container 63. In a state where the filter 62 is attached to the filter support 61d, at least some of the through holes of the outer wall 63a are not closed by the filter support 61d, and fluidly connected to a flow path formed between the side wall 61a and the filter support 61d.

A through hole 63e is formed in the central portion of the top wall 63c. That is, the top wall 63c is formed in an annular shape. The top wall 63c closes one end side of the outer wall 63a and the inner wall 63b, between the outer wall 63a and the inner wall 63b. The bottom wall 63d closes the whole of the other end side of the outer wall 63a and the inner wall 63b.

The filter main body 64 is formed in a cylindrical shape. The filter main body 64 is disposed within a space surrounded by the outer wall 63a, the inner wall 63b, the top wall 63c, and the bottom wall 63d. The material of the filter main body 64 may be, for example, nylon or polyethylene. The filter main body 64 may have a performance of removing particles of, for example, about 0.05 μm. A new filter main body 64 includes a number of particles therein. Thus, when the filter 62 is replaced by a new filter 62, it is preferable to cause the processing liquid to flow through the filter 62 in advance so as to remove the particles from the filter main body 64.

The top wall 61c of the case 61 is formed with an inlet port 65a configured to introduce the processing liquid from the pump devices P1 and P2, an outlet port 65b configured to discharge the processing liquid which has passed through the filter 62, and a drain port 65c configured to discharge the processing liquid which has not passed through the filter 62 to the outside of the system. The outlet port 65b is communicated with the through hole 63e of the top wall 63c.

The processing liquid introduced from the inlet port 65a is discharged to the outside of the filter device F1 from the outlet port 65b or the drain port 65c. When flowing from the inlet port 65a to the outlet port 65b, the processing liquid flows in a flow path formed between the side wall 61a, the bottom wall 61b and the filter support 61d, the processing liquid, and then flows in the through holes of the outer wall 63a, the filter main body 64, the through holes of the inner wall 63b, and the inside of the inner wall 63b in this order. Then, the processing liquid is discharged to the outside of the filter device F1 through the through hole 63e of the top wall 63c and the outlet port 65b. Meanwhile, when flowing from the inlet port 65a to the drain port 65c, the processing liquid flows in a flow path formed between the side wall 61a, the bottom wall 61b, and the filter support 61d, and then a part of the processing liquid flows in the filter 62. However, the remainder of the processing liquid continuously flows in the flow path to be discharged to the outside of the filter device F1 through the drain port 65c.

Referring back to FIG. 5, the upstream end of the pipe D1 is connected to the processing liquid source. The downstream end of the pipe D1 is connected to the pipe D2. In the pipe D1, the valve V1, the regulator R1, and the pressure gauge M1 are provided in this order from the upstream side. The valve V1 is an air-operated valve which is opened/closed (ON/OFF) by air. The regulator R1 is a pressure control valve configured to adjust the magnitude of the pressure to be applied to the processing liquid flowing therein so as to control the flow rate of the processing liquid. The magnitude of the pressure set in the regulator R1 is, for example, 100 kPa. Herein, the pressure is indicated by a gauge pressure.

The downstream side of the pipe D2 diverges into the pipes D3 and D4. The downstream end of the pipe D3 is connected to the degassing nozzle 52a of the pump device P1. In the pipe D3, the valve V2 is provided. The downstream end of the pipe D4 is connected to the degassing nozzle 52a of the pump device P2. In the pipe D4, the valve V3 is provided. Each of the valves V2 and V3 is an air-operated valve which is the same as the valve V1.

The upstream end of the pipe D5 is connected to the $N_2$ gas source. The downstream end of the pipe D5 is connected to the connection port 51c of the pump device P1. In the pipe D5, the regulator R2, the pressure gauge M2, and the valve V4 are provided in this order from the upstream side. The regulator R2 is a pressure control valve which is the same as the regulator R1. The magnitude of the pressure set in the regulator R2 is, for example, 200 kPa. The valve V4 is an air-operated valve which is the same as the valve V1.

The pipe D6 diverges from the pipe D5 and then joins to the pipe D5 again. The upstream end of the pipe D6 is connected to the pipe D5 at the upstream side of the regulator R2. The downstream end of the pipe D6 is connected to the pipe D5 at the downstream side of the valve V4. In the pipe D6, the regulator R3 and the valve V5 are provided in this order from the upstream side. The regulator R3 is an electro-pneumatic regulator configured to optionally adjust the magnitude of the pressure of the $N_2$ gas so as to control the flow rate of the $N_2$ gas. The electro-pneumatic regulator is a pressure control valve which converts an electrical signal to an air pressure signal. The electro-pneumatic regulator may set a plurality of magnitudes of pressure to be applied to the $N_2$ gas in advance so that the pressure of the pump device P1 and P2 may be changed and the processing liquid may flow from the pump device P1 and P2 at different flow rates. Two magnitudes of pressure, for example, 25 kPa and 50 kPa, may be set in the regulator R3. The regulator R3 may switch the magnitude of pressure between a first value (e.g., 25 kPa) and a second value (e.g., 50 kPa) according to a control signal received from the control device CU.

The pipe D7 diverges from the pipe D5. The upstream end of the pipe D7 is connected to the pipe D5 between the pressure gauge M2 and the valve V4. The downstream end of the pipe D7 is connected to the connection port 51c of the pump device P2. The valve V6 is provided in the pipe D7. The valve V6 is an air-operated valve which is the same as the valve V1.

The pipe D35 diverges from the pipe D6. The upstream end of the pipe D35 is connected to the pipe D6 between the regulator R3 and the valve V5. The downstream end of the pipe D35 is connected to the pipe D7 between the valve V6 and the connection port 51c of the pump device P2. In the pipe D35, the valve V32 is provided. The valve V32 is an air-operated valve which is the same as the valve V1. The $N_2$ gas source, the pipes D5 to D7 and D35, the regulators R2 and R3, and the valves V4 to V6 and V32 serve as a part of a supply discharge section configured to discharge the degassed liquid from the inside of the pump devices P1 and P2.

The pipe D8 is disposed between an air source and the ejector E. The ejector E is constituted by a nozzle, a diffuser, and a connection unit to which the nozzle and the diffuser are connected. The upstream end of the pipe D8 is connected to the air source. The downstream end of the pipe D8 is connected to the nozzle of the ejector E. In the pipe D8, the regulator R4, the pressure gauge M3, and the valve V7 are provided in this order from the upstream side. The regulator R4 is a pressure control valve which is the same as the regulator R1. The regulator R4 is adjusted such that the pressure within the gas chamber C2 of the pump device P1 and P2 becomes, for example, about −35 kPa. The valve V7 is an air-operated valve which is the same as the valve V1.

The pipe D9 diverges from the pipe D8. The upstream end of the pipe D9 is connected to the pipe D8 at the upstream side of the regulator R4. The downstream end of the pipe D9 is connected to the pipe D8 between the valve V7 and the ejector E. In the pipe D9, the regulator R5, the pressure gauge M4 and the valve V8 are provided in this order from the upstream side. The regulator R5 is a pressure control valve which is the same as the regulator R1. The regulator R5 is adjusted such that the pressure within the gas chamber C2 of the pump device P1 and P2 becomes, for example, about −80 kPa. The valve V8 is an air-operated valve which is the same as the valve V1.

The upstream end of the pipe D10 is connected to the diffuser of the ejector E. The gas flowing in the pipe D10 is discharged to the outside of the system from the downstream end of the pipe D10.

One end of the pipe D11 is connected to the connection unit of the ejector E. The other end of the pipe D11 diverges into the pipes D12 and D13, and is connected to each of one ends of the pipes D12, and D13. The other end of the pipe D12 is connected to the pipe D5 between a joining point of the pipes D5 and D6 and the connection port 51c of the pump device P1. In the pipe D12, the valve V9 is provided. The other end of the pipe D13 is connected to the pipe D7 between the valve V6 and the connection port 51c of the pump device P2. In the pipe D13, the valve V10 is provided. Each of the valves V9 and V10 is an air-operated valve which is the same as the valve V1. The air source, the pipes D8 to D13, the regulators R4 and R5, and the valves V7 to V10 serve as a part of the supply discharge section configured to store, within the pump devices P1 and P2, the degassed liquid by supplying the processing liquid from the processing liquid source into the pump devices P1 and P2 through the degassing nozzle 52a.

The upstream end of the pipe D14 is connected to the drain port 52c of the pump device P1. The upstream end of the pipe D15 is connected to the drain port 52c of the pump device P2. Both downstream ends of the pipes D14 and D15 are connected to the upstream end of the pipe D16. The gas flowing in the pipe D16 is discharged from the downstream end of the pipe D16 to the outside of the system. In the pipe D14, the valve V11 is provided. In the pipe D15, the valve V12 is provided. Each of the valves V11 and V12 is an air-operated valve which is the same as the valve V1.

The upstream end of the pipe D17 is connected to the outlet port 52b of the pump device P1. The upstream end of the pipe D18 is connected to the outlet port 52b of the pump device P2. Both the downstream ends of the pipes D17 and D18 are connected to the upstream end of the pipe D19. In the pipe D17, the valve V13 is provided. In the pipe D18, the valve V14 is provided. Each of the valves V13 and V14 is an air-operated valve which is the same as the valve V1.

The downstream side of the pipe D19 diverges into the pipes D20 to D22. The downstream end of the pipe D20 is connected to the inlet port 65a of the filter device F1. The upstream end of the pipe D23 is connected to the outlet port 65b of the filter device F1. In the pipe D23, the flowmeter FM1, the valve V15 and the nozzle N1 are provided in this order from the upstream side. The flowmeter FM1 is an ultrasonic flowmeter configured to measure the flow velocity of the processing liquid flowing in the pipe D23 by using ultrasonic waves so as to calculate a flow rate based on the flow velocity. When the ultrasonic flowmeter is used, the flow rate may be detected without providing a measuring instrument in a pipe, thereby suppressing the occurrence of pressure loss. The valve V15 is an air-operated valve having a flow rate control function.

The pipe D24 diverges from the pipe D23 at the upstream side of the flowmeter FM1. In the pipe D24, the flowmeter FM2, the valve V16, and the nozzle N2 are provided in this order from the upstream side. The flowmeter FM2 is an ultrasonic flowmeter which is the same as the flowmeter FM1. The valve V16 is an air-operated valve which is the same as the valve V15.

The upstream end of the pipe D25 is connected to the drain port 65c of the filter device F1. In the pipe D25, the valve V17 is provided. The valve V17 is a manual valve which is manually opened and closed. The liquid flowing in the pipe D25 is discharged from the downstream end of the pipe D25 to the outside of the system. A new filter main body 64 includes a large amount of dry air. Thus, when the filter 62 is replaced by a new filter, the manual valve may be opened to discharge the air included in the filter main body 64.

The pipe D26 diverges from the pipe D25 and then joins to the pipe D25 again. In the pipe D26, the valve V18, the flowmeter FM3, and the valve V19 are provided in this order from the upstream side. The valve V18 is an air-operated valve which is the same as the valve V1. The flowmeter FM3 is an area-type (float-type) flowmeter configured to read out a flow rate by a position of a float floating within a tapered pipe. The valve V19 is a check valve, and is operated such that the processing liquid flows from the upstream side of the pipe D26 toward the downstream side but does not flow in the reverse direction.

The downstream end of the pipe D21 is connected to the inlet port 65a of the filter device F2. The upstream end of the pipe D27 is connected to the outlet port 65b of the filter device F2. In the pipe D27, the flowmeter FM4, the valve V20, and the nozzle N3 are provided in this order from the upstream side. The flowmeter FM4 is an ultrasonic flowmeter which is the same as the flowmeter FM1. The valve V20 is an air-operated valve having a flow rate control function, which is the same as the valve V15.

The pipe D28 diverges from the pipe D27 between the flowmeter FM4 and the valve V20. In the pipe D28, the valve V21 and the nozzle N4 are provided in this order from the upstream side. The valve V21 is an air-operated valve having a flow rate control function, which is the same as the valve V15.

The upstream end of the pipe D29 is connected to the drain port 65c of the filter device F2. In the pipe D29, the valve V22 is provided. The valve V22 is a manual valve which is the same as the valve V17. The liquid flowing in the pipe D29 is discharged from the downstream end of the pipe D29 to the outside of the system.

The pipe D30 diverges from the pipe D29 and then joins to the pipe D29 again. In the pipe D30, the valve V23, the flowmeter FM5 and the valve V24 are provided in this order from the upstream side. The valve V23 is an air-operated valve which is the same as the valve V1. The flowmeter FM5 is an area-type flowmeter which is the same as the flowmeter FM3. The valve V24 is a check valve which is the same as the valve V19.

The downstream end of the pipe D22 is connected to the inlet port 65a of the filter device F3. The upstream end of the pipe D31 is connected to the outlet port 65b of the filter device F3. In the pipe D31, the flowmeter FM6, the valve V25 and the nozzle N5 are provided in this order from the upstream side. The flowmeter FM6 is an ultrasonic flowmeter which is the same as the flowmeter FM1. The valve V25 is an air-operated valve having a flow rate control function, which is the same as the valve V15.

The pipe D32 diverges from the pipe D23. The upstream end of the pipe D32 is connected to the pipe D23 between the flowmeter FM1 and the valve V15. The downstream end of the pipe D32 is connected to the upstream end of the pipe D2. The pipe D32, together with a part of the pipe D2, serves as a part of a first circulation line configured to return the processing liquid into the pump device P1 and P2. In the pipe D32, the valve V26, and the valve V27 are provided in this order from the upstream side. The valve V26 is an air-operated valve having a flow rate control function, which is the same as the valve V15. The valve V27 is a check valve which is the same as the valve V19. The filter device F1 is located at the upstream side of the upstream end of the pipe D32 in an ejecting line, and thus there is no need to provide the filter device F1 in both the circulation line and the ejecting line, and the number of the filter devices F1 may be reduced.

The pipe D33 diverges from the pipe D27. The upstream end of the pipe D33 is connected to the pipe D27 between the flowmeter FM4 and the junction of the pipes D27 and D28. The downstream end of the pipe D33 is connected to the upstream end of the pipe D2. The pipe D33, together with a part of the pipe D2, serves as a part of a second circulation line configured to return the processing liquid into the pump device P1 and P2. In the pipe D33, the valve V28 and the valve V29 are provided in this order from the upstream side. The valve V28 is an air-operated valve having a flow rate control function, which is the same as the valve V15. The valve V29 is a check valve which is the same as the valve V19. The filter device F2 is located at the upstream side of the upstream end of the pipe D33 in an ejecting line, and thus there is no need to provide the filter device F2 in both the circulation line and the ejecting line, and the number of the filter devices F2 may be reduced.

The pipe D34 diverges from the pipe D2. The upstream end of the pipe D34 is connected to the upstream side of the joining point of the pipes D1 and D2. In the pipe D34, the valve V30 is provided. The valve V30 is an air-operated valve which is the same as the valve V1. The liquid flowing in the pipe D34 is discharged from the downstream end of the pipe D34 to the outside of the system. Accordingly, the pipe D34 serves as a part of a discharging line configured to discharge the processing liquid flowing in the first or second circulation line to the outside of the system.

On the pipe D2, the valve V31 is provided between the junction of the pipes D1 and D2 and the junction of the pipes D34 and D2. The valve V31 is an air-operated valve having a flow rate control function, which is the same as the valve V15. The pipes D17 to D24, D27, D28 and D31 serve as the ejecting line configured to eject the processing liquid discharged from the pump devices P1 and P2 to the substrate W through the nozzles N1 to N5.

The valves V1 to V16, V18, V20, V21, V23, V25, V26, V28, V30, and V31 are opened and closed according to the control signal received from the control device CU. Each of the regulators R1 to R5 adjusts the magnitude of the pressure to be applied to the processing liquid flowing therein according to the control signal received from the control device CU. In each of the regulators R1, R2, R4 and R5, the magnitude of the pressure to be applied to the processing liquid, the $N_2$ gas or the air which flows in the regulator may be manually adjusted. In the regulator R3, the magnitude of the pressure to be applied to the $N_2$ gas which flows in the regulator may be dynamically adjusted according to a predetermined program.

(Operation of Pump Device)

Subsequently, referring to FIG. 5, suction and ejection of the processing liquid by the pump devices P1 and P2 will be described. This operation is the same in both the pump devices P1 and P2. Thus, hereinafter, the suction and ejection of the pump device P1 will be described, and descriptions on the suction and ejection of the pump device P2 will be omitted.

First, the control device CU makes an instruction to open the valves V1, V2, V7, and V9 at the initial state where all valves are closed. Accordingly, the air from the air source flows in the pipe D8, the ejector E, and the pipe D10 in this order, so that a negative pressure is generated in the connection unit of the ejector E. Thus, the inside of the gas chamber C2 of the pump device P1 is decompressed through the pipes D11, D12 and D5 connected to the connection unit of the ejector E, and the piston plate 53a is drawn to the bottom wall 51b side of the case 51. Accordingly, the volume of the bellows pump 53 is expanded, and the processing liquid is introduced into the bellows pump 53 from the processing liquid source through the degassing nozzle 52a. Here, the processing liquid is degassed while passing through the degassing nozzle 52a. Thus, the degassed processing liquid, and gases separated from the processing liquid by degassing are introduced into the bellows pump 53.

Then, the control device CU makes an instruction to close the valves V1, V2, V7 and V9, and to open the valve V11. Accordingly, a part of the degassed liquid, together with the gases separated from the processing liquid by the degassing, is discharged to the outside of the bellows pump 53.

Then, the control device CU makes an instruction to close the valve V11, and to open the valves V4 and V13. Accordingly, the $N_2$ gas supplied from the $N_2$ gas source flows in the pipe D5, and the inside of the gas chamber C2 of the pump device P1 is pressurized so that the piston plate 53a is pushed out to the cover 52 side. Accordingly, the processing liquid is supplied to any one of the nozzles N1 to N5 through the outlet port 52b and the pipe D17, returned to the pump devices P1 and P2 by being circulated by the pipes D32 and D33, or discharged to the outside of the system from any one of the pipes D25, D29, and D34.

(Opening/Closing Timing of Valve)

Figure 8A:
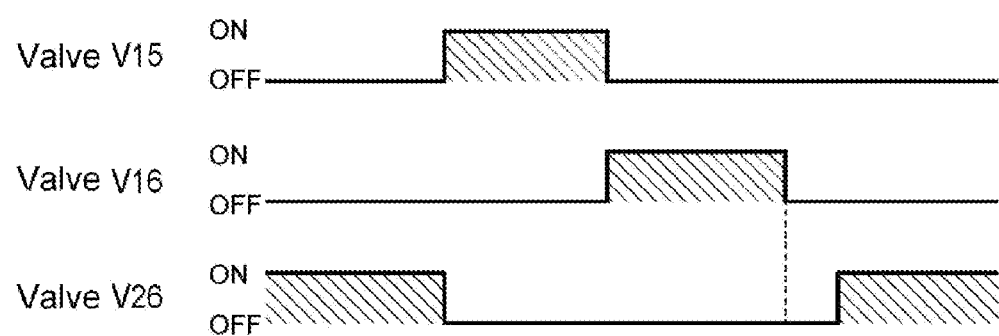
FIGS. 8A and 8B are views for explaining a predetermined opening/closing timing of a valve.

Subsequently, referring to FIGS. 5 and 8, a predetermined opening/closing timing of a valve will be described. First, the opening/closing timing of the valves V15, V16 and V26 will be described (FIG. 8A). The control device CU makes an instruction to open the valve V26 (ON), and to close the valves V15 and V16 (OFF). Here, the processing liquid discharged from the pump devices P1 and P2 is not ejected from the nozzles N1 and N2, but flows in the pipe D32 constituting a part of the first circulation line. Then, the processing liquid is returned to the pump devices P1 and P2 and then the processing liquid is circulated in the system again or discharged from the pipe D34 to the outside of the system.

Then, the control device CU makes an instruction to open the valve V15 (ON), and to close the valves V16 and V26 (OFF). Here, the processing liquid discharged from the pump devices P1 and P2 is ejected from the nozzle N1. Then, the control device CU makes an instruction to open the valve V16 (ON), and to close the valves V15 and V26 (OFF). As illustrated in FIG. 8A, the valve V26 is opened after some delay from closing of the valve V16. Here, the processing liquid discharged from the pump devices P1 and P2 is ejected from the nozzle N2. As described above, the valves V15, V16, and V26 are controlled so that any one of the valves is opened, other valves are closed.

Figure 8B:
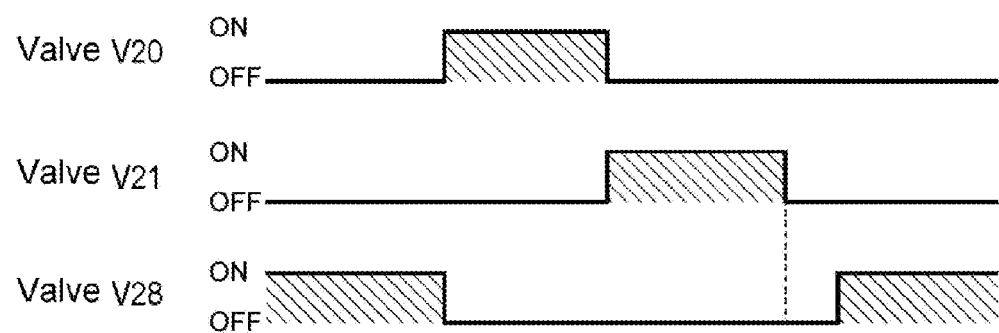

Now, the opening/closing timing of the valves V20, V21 and V28 will be described (FIG. 8B). The control device CU makes an instruction to open the valve V28 (ON), and to close the valves V20 and V21 (OFF). Here, the processing liquid discharged from the pump devices P1 and P2 is not ejected from the nozzles N3, and N4, but flows in the pipe D33 constituting a part of the second circulation line. Then, the processing liquid is returned to the pump devices P1 and P2 and then, the processing liquid is circulated in the system again or discharged from the pipe D34 to the outside of the system.

Then, the control device CU makes an instruction to open the valve V20 (ON), and to close the valves V21 and V28 (OFF). Here, the processing liquid discharged from the pump devices P1 and P2 is ejected from the nozzle N3. Then, the control device CU makes an instruction to open the valve V21 (ON), and to close the valves V20, and V28 (OFF). As illustrated in FIG. 8B, the valve V28 is opened after some delay from closing of the valve V21. Here, the processing liquid discharged from the pump devices P1 and P2 is ejected from the nozzle N4. As described above, the valves V20, V21, and V28 are controlled so that any one of the valves is opened, other valves are closed.

(Circulation Mode)

Figure 9:
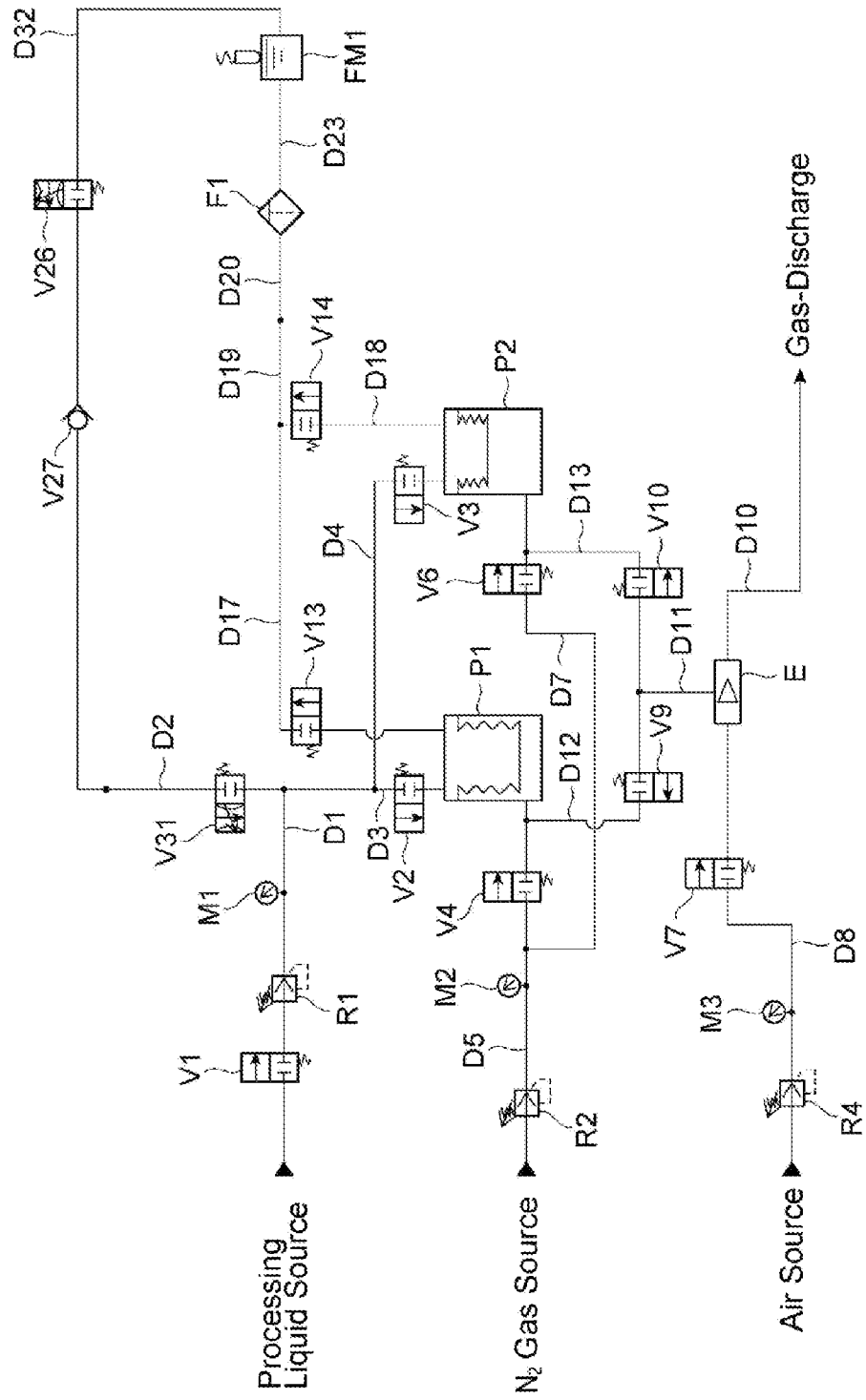
FIG. 9 is a view illustrating elements required for explaining a circulation mode in the liquid supply system of FIG. 5.

Subsequently, referring to FIGS. 9 and 10, the circulation mode will be described in which the processing liquid is circulated by the first or second circulation line in the system. FIG. 9 is a view illustrating elements required for explaining the circulation mode in the supply system 24a of FIG. 5. FIG. 9 illustrates an element (the pipe D32) in the first circulation line, and illustration of an element (the pipe D33) in the second circulation line is omitted in FIG. 9. However, the operation of the supply system 24a in the circulation mode through the second circulation line is the same as the operation of the supply system 24a in the circulation mode through the first circulation line. Accordingly, hereinafter, the descriptions on the second circulation line will be omitted.

Figure 10:
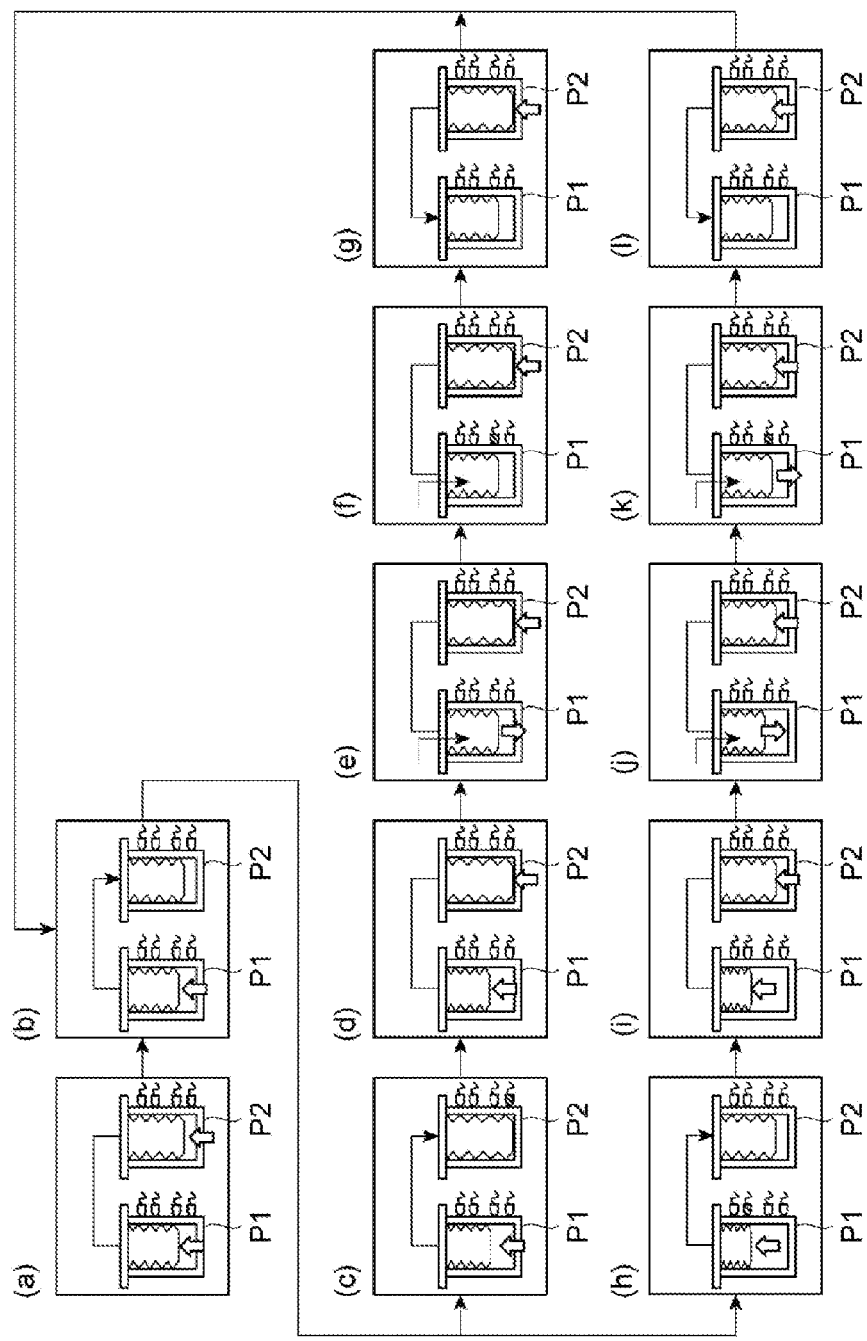
FIG. 10 is a view for explaining an operation of two bellows pumps in the circulation mode.

First, in the initial state (step 1) illustrated in (a) of FIG. 10, the control device CU makes an instruction to open the valves V4 and V6. Thus, the inside of the gas chambers C2 of both the pump devices P1 and P2 are pressurized by the $N_2$ gas from the $N_2$ gas source, and a force for pushing out the piston plate 53a to the cover 52 side acts on the piston plate 53a.

Then, step 2 will be described with reference to (b) of FIG. 10. In step 2, the control device CU makes an instruction to open the valve V10 and to close the valves V6 and V14 so that the pressure within the gas chamber C2 of the pump device P2 becomes lower than the pressure within the gas chamber C2 of the pump device P1. Accordingly, a pressure difference occurs between the bellows pump 53 of the pump device P1 and the bellows pump 53 of the pump device P2. Accordingly, the processing liquid stored in the bellows pump 53 of the pump device P1 flows in the outlet port 52b, the pipes D17, D19, and D20, the filter device F1, and the pipes D23, D32, D2 and D4 in this order, and is fed into the bellows pump 53 of the pump device P2. Then, the processing liquid within the bellows pump 53 of the pump device P1 is reduced, and the processing liquid within the bellows pump 53 of the pump device P2 is increased ((b) of FIG. 10).

Hereinafter, the circulation mode will be described based on a first pattern and a second pattern, separately. In the first pattern, before the processing liquid within the bellows pump 53 of the pump device P1 is almost completely discharged, the processing liquid is filled within the bellows pump 53 of the pump device P2 (steps 3 to 7, (c) to (g) of FIG. 10). In the second pattern, before the processing liquid is filled within the bellows pump 53 of the pump device P2, the processing liquid within the bellows pump 53 of the pump device P1 is almost completely discharged (steps 8 to 12, (h) to (l) of FIG. 10).

First, step 3 will be described with reference to (c) of FIG. 10. In step 3, the sensor 55d of the pump device P2 detects whether the processing liquid is filled within the bellows pump 53 (the processing liquid chamber C1) ((c) of FIG. 10). When the bellows pump 53 of the pump device P2 is filled, the processing liquid is required to be fed to the bellows pump 53 of the pump device P1. However, since the pressure within the gas chamber C2 of the pump device P2 is lower than the pressure within the gas chamber C2 of the pump device P1, it is impossible to push out the piston plate 53a of the pump device P2. Accordingly, the processing in step 4 is performed.

Step 4 will be described with reference to (d) of FIG. 10. In step 4, when receiving a detection signal from the sensor 55d of the pump device P2, the control device CU makes an instruction to open the valve V6. Accordingly, the inside of the gas chamber C2 of the pump device P2 is pressurized by the $N_2$ gas from the $N_2$ gas source, and a force for pushing out the piston plate 53a to the cover 52 side acts on the piston plate 53a ((d) of FIG. 10). The pressurization of the inside of the pump device P2 is performed for, for example, about 15 sec. Here, since the valve V14 is closed, the processing liquid stored in the bellows pump 53 of the pump device P1 flows in the outlet port 52b, the pipes D17, D19 and D20, the filter device F1 and the pipes D23, D32, D2 and D3 in this order, and is returned into the bellows pump 53 of the pump device P1.

Step 5 will be described with reference to (e) of FIG. 10. In step 5, the control device CU makes an instruction to open the valves V1, V2, V7 and V9, and to close the valve V3. Accordingly, the air from the air source flows in the pipe D8, the ejector E, and the pipe D10 in this order, and a negative pressure is generated in the connection unit of the ejector E. Thus, through the pipes D11, D12, and D5 connected to the connection unit of the ejector E, the inside of the gas chamber C2 of the pump device P1 is decompressed, and the piston plate 53a is drawn to the bottom wall 51b side of the case 51. Accordingly, the processing liquid is introduced into the bellows pump 53 from the processing liquid source through the degassing nozzle 52a ((e) of FIG. 10). The processing liquid stored in the bellows pump 53 of the pump device P2 flows in the outlet port 52b, the pipes D18, D19, and D20, the filter device F1, and the pipes D23, D32, D2, and D3, in this order, and is returned into the bellows pump 53 of the pump device P1 (the same drawing).

Step 6 will be described with reference to (f) of FIG. 10. In step 6, the sensor 55c of the pump device P1 detects whether the inside of the bellows pump 53 (the processing liquid chamber C1) is almost filled with the processing liquid ((f) of FIG. 10). This is because when the bellows pump 53 of the pump device P1 is completely filled, there is no room for expanding the bellows pump 53 of the pump device P1 in circulation of the processing liquid from the bellows pump 53 of the pump device P2 to the bellows pump 53 of the pump device P1. Here, the control device CU makes an instruction to open the valve V11, so that a part of the degassed liquid, together with the gases separated from the processing liquid by degassing, is discharged to the outside of the bellows pump 53 from the drain port 52c.

Hereinafter, step 7 will be described with reference to (g) of FIG. 10. In step 7, when receiving the detection signal from the sensor 55c of the pump device P1, the control device CU makes an instruction to open the valve V9 and to close the valve V1, so that the pressure within the gas chamber C2 of the pump device P1 is lower than the pressure within the gas chamber C2 of the pump device P2. Accordingly, a pressure difference occurs between the bellows pump 53 of the pump device P1 and the bellows pump 53 of the pump device P2. Thus, the processing liquid stored in the bellows pump 53 of the pump device P2 flows in the outlet port 52b, the pipes D18, D19 and D20, the filter device F1, and the pipes D23, D32, D2 and D3 in this order, and is fed into the bellows pump 53 of the pump device P1 ((g) of FIG. 10). Step 7 ((g) of FIG. 10) is the same as step 2 ((b) of FIG. 10), except that the pump device P2 and the pump device P1 are exchanged with each other. Accordingly, the above descriptions on the circulation mode processings following step 2 may be applied to the circulation mode processings following step 7 when the pump device P1 and the pump device P2 are exchanged with each other.

Now, step 8 will be described with reference to (h) of FIG. 10. In step 8, the sensor 55b of the pump device P1 detects if the processing liquid within the bellows pump 53 (the processing liquid chamber C1) of the pump device P1 is almost completely discharged before the processing liquid is filled within the bellows pump 53 of the pump device P2 ((h) of FIG. 10).

Following steps 9 to 12 illustrated in (i) to (l) of FIG. 10 are the same as steps 4 to 7 as described above, and thus descriptions thereof will be omitted. Step 12 ((l) of FIG. 10) is the same as step 2 ((b) of FIG. 10), except that the pump device P1 and the pump device P2 are exchanged with each other. Accordingly, the above descriptions on the circulation mode processings following step 2 may be applied to the circulation mode processings following step 12 when the pump device P1 and the pump device P2 are exchanged with each other.

However, when the processing liquid is in contact with the filter main body 64, the particles included in the filter main body 64 are gradually eluted to the processing liquid. Accordingly, when the flow of the processing liquid stays in the filter main body 64, the concentration of particles in the processing liquid is gradually increased. When such a processing liquid is ejected to a substrate W through the ejecting line, many particles are attached on the substrate W. Thus, a defect may occur on a processed substrate W. However, in the circulation mode as described above, even after the ejection of the processing liquid from the pump device P1 is completed, the processing liquid may be ejected from the pump device P2. While the processing liquid is ejected from the pump device P2, the processing liquid may be supplied to the pump device P1. Thus, even after the ejection of the processing liquid from the pump device P2 is completed, the processing liquid may be ejected from the pump device P1. Accordingly, the processing liquid may be continuously supplied to the filter device F1. Further, in the circulation mode as described above, the processing liquid discharged from the pump device P1 passes through the filter device F1, and is returned to the pump device P2 through the pipes D32 and D2 constituting the circulation line. Likewise, the processing liquid discharged from the pump device P2 passes through the filter device F1, and is returned to the pump device P1 through the pipes D32 and D2 constituting the circulation line. Thus, in the filter device F1, the processing liquid flows without staying. Accordingly, since an increase of the concentration of particles in the processing liquid is suppressed, it is possible to suppress the possibility that a defect occurs in the substrate W.

(Filter Maintenance Mode)

Figure 11:
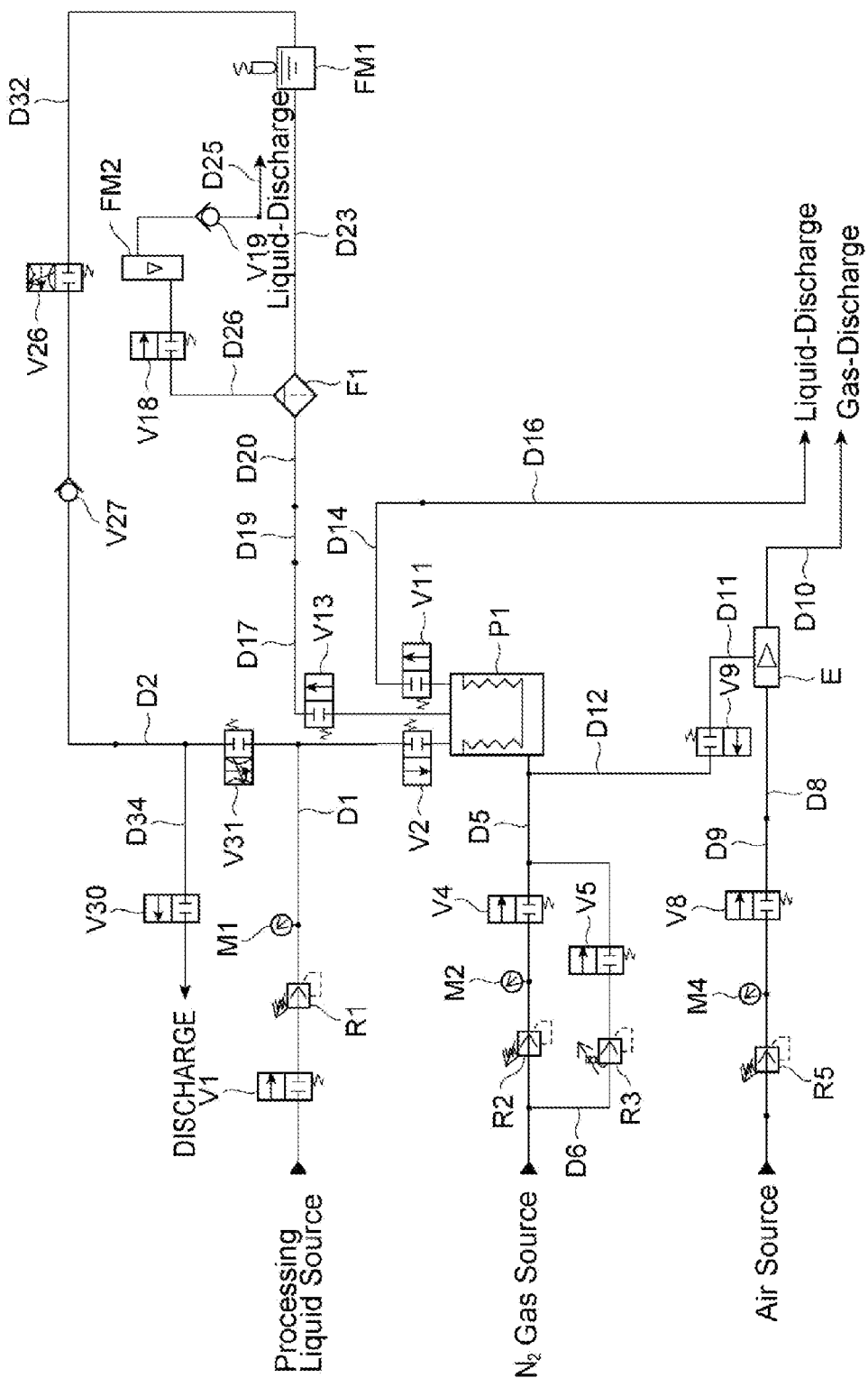
FIG. 11 is a view illustrating elements required for explaining a filter maintenance mode in the liquid supply system of FIG. 5.
Figure 13:
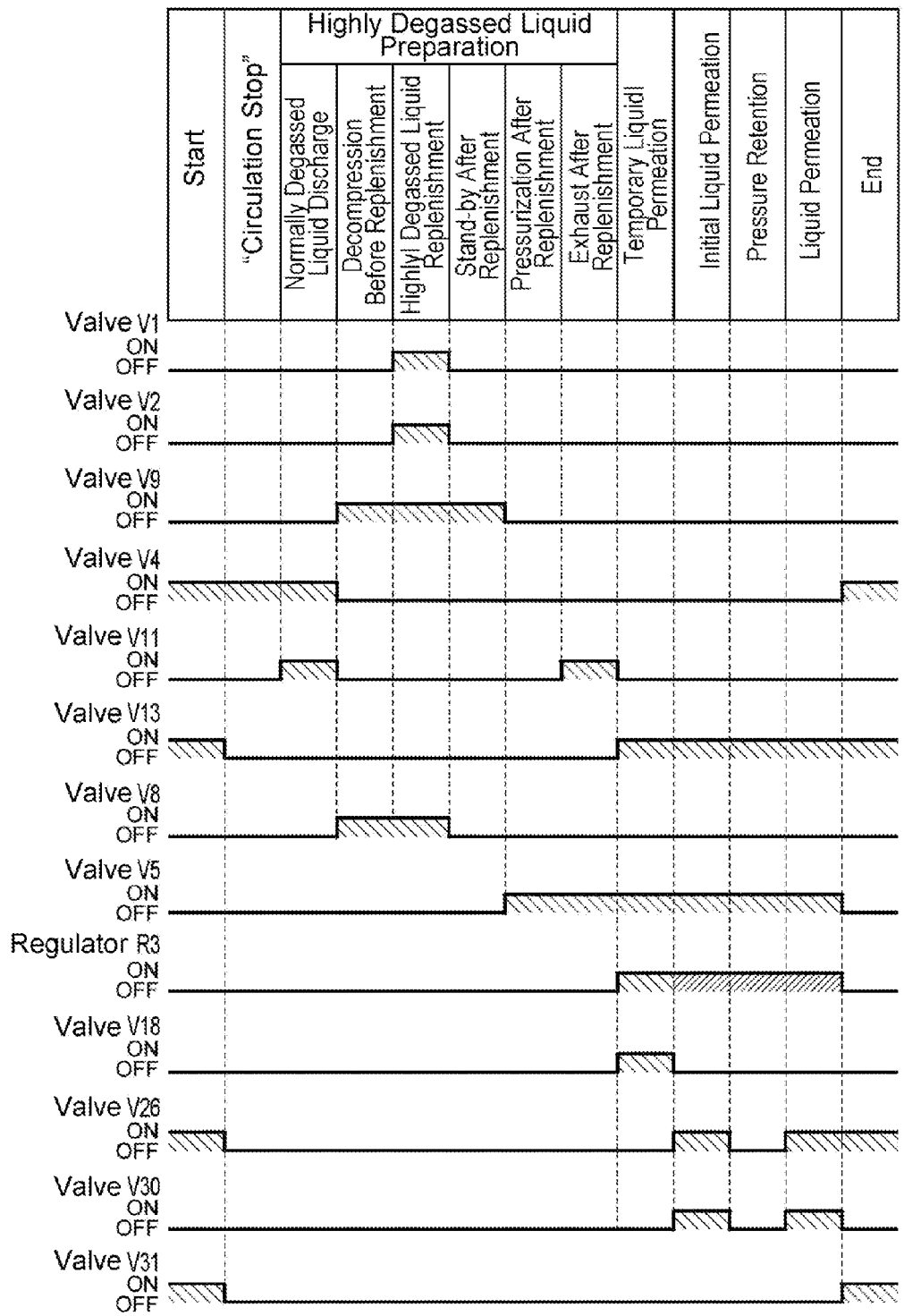
FIG. 13 is a view for explaining opening and closing operations of respective valves in the filter maintenance mode.

Subsequently, referring to FIGS. 11 to 13, the filter maintenance mode will be described. FIG. 11 is a view illustrating elements required for explaining the filter maintenance mode in the supply system 24a of FIG. 5 in which other elements are omitted. FIG. 11 illustrates elements related to the pump device P1, and elements related to the pump device P2 are omitted in FIG. 11. Hereinafter, an operation of a filter maintenance mode using the pump device P1 will be described, but an operation of a filter maintenance mode using the pump device P2 is the same as that of the pump device P1. Accordingly, hereinafter, the descriptions on the filter maintenance mode using the pump device P2 will be omitted.

The filter maintenance mode includes a refreshing operation and an initial operation. In the refreshing operation, air included in the filter main body 64 is removed using the first or second circulation line, and in the initial operation, the processing liquid is caused to permeate a new filter 62 as a replacement so as to remove particles included in the filter main body 64 of the new filter 62. The refreshing operation is performed when, for example, the filter 62 has been used for a long period longer than a predetermined period, or the number of defective substrates W or the ratio of defects occurring in a substrate W is not less than a predetermined value. The time when the refreshing operation is initiated is set between steps 2 and 3 in the circulation mode (between steady states).

FIG. 11 illustrates an element (the pipe D32) in the first circulation line, and illustration of an element (the pipe D33) in the second circulation line is omitted in FIG. 11. However, the operation of the supply system 24a in the filter maintenance mode through the second circulation line is the same as the operation of the supply system 24a in the filter maintenance mode through the first circulation line. Accordingly, hereinafter, the descriptions on the second circulation line including the filter device F2 will be omitted.

First, prior to initiation of the filter maintenance mode, step 11 ("Start" of FIG. 13) will be described. In step 11, the valves V4, V13, V26 and V31 are opened, and the valves V1, V2, V9, V11, V8, V5, V18, and V30 and the regulator R3 are closed. Thus, the processing liquid is circulated through the first circulation line.

Then, step 12 (FIG. 12A, "Circulation Stop" of FIG. 13) will be described. In step 12, the control device CU makes an instruction to close the valves V13, V26 and V31. Accordingly, the circulation of the processing liquid through the first circulation line is stopped. Here, as illustrated in FIG. 12A, the filter main body 64 is wet with the processing liquid, but the processing liquid is not circulated within the filter device F1. Further, since the valve V4 is opened, the inside of the gas chamber C2 of the pump device P1 is pressurized by the $N_2$ gas from the $N_2$ gas source, and a force for pushing out the piston plate 53a to the cover 52 side acts on the piston plate 53a.

Subsequently, step 13 ("Normally Degassed Liquid Discharge" in FIG. 13) will be described. In step 13, the control device CU makes an instruction to open the valve V11. Accordingly, along with the pressurization of the inside of the gas chamber C2 of the pump device P1, the processing liquid is completely discharged from the inside of the bellows pump 53 of the pump device P1 to the outside of the system. Accordingly, in step 15 to be described later ("Highly Degassed Liquid Replenishment" in FIG. 13), when a highly degassed liquid is supplied into the bellows pump 53 of the pump device P1, the highly degassed liquid may be stored in a larger amount within the bellows pump 53.

Subsequently, step 14 ("Decompression Before Replenishment" in FIG. 13) will be described. In step 14, the control device CU makes an instruction to open the valves V9 and V8, and to close the valves V4, and V11. Accordingly, the air from the air source flows in the pipe D8, the ejector E and the pipe D10 in this order, and a negative pressure is generated in the connection unit of the ejector E. Accordingly, the inside of the gas chamber C2 of the pump device P1 is decompressed through the pipes D11, D12 and D5 connected to the connection unit of the ejector E.

Subsequently, step 15 ("Highly Degassed Liquid Replenishment" in FIG. 13) will be described. In step 15, the control device CU makes an instruction to open the valves V1 and V2. Accordingly, the piston plate 53a of the pump device P1 is suddenly drawn to the bottom wall 51b side of the case 51. Accordingly, the volume of the bellows pump 53 of the pump device P1 is expanded, and the processing liquid is introduced into the bellows pump 53 from the processing liquid source through the degassing nozzle 52a. Here, the processing liquid is degassed when passing through the degassing nozzle 52a. Thus, the degassed liquid, and the gases separated from the processing liquid by degassing are introduced into the bellows pump 53.

Here, in the pipe D9 in which the valve V8 is located, the regulator R5 is provided. The magnitude of the pressure set in the regulator R5 is larger than the magnitude of the pressure set in the regulator R4. Accordingly, in step 15, the inside of the gas chamber C2 is further decompressed as compared to a case where the regulator R4 is used. Thus, the processing liquid is drawn into the bellows pump 53 of the pump device P1 at a higher flow velocity through the degassing nozzle 52a. As a result, the pressure of the processing liquid is further reduced, and the gases dissolved in the processing liquid are removed in a large amount from the processing liquid. When coming in contact with fine bubbles present in the filter main body 64, the highly degassed liquid serves a function of collecting the fine bubbles. Accordingly, it is possible to more effectively collect the fine bubbles present in the filter main body 64 when the highly degassed liquid permeates the filter main body 64. Accordingly, the performance of the filter main body 64 may be improved. The degassed liquid may be referred to as a "Highly Degassed Liquid" in the present specification in distinction from a degassed liquid prepared by the regulator R4 (a normally degassed liquid).

Hereinafter, step 16 ("Stand-by After Replenishment" in FIG. 13) will be described. In step 16, the control device CU makes an instruction to close the valves V1, V2 and V8. Here, the state where the highly degassed liquid is stored within the bellows pump 53 of the pump device P1 is maintained.

Subsequently, step 17 ("Pressurization After Replenishment" in FIG. 13) will be described. In step 17, the control device CU makes an instruction to open the valve V5 and to close the valve V9. Accordingly, the inside of the gas chamber C2 of the pump device P1 is pressurized, but the highly degassed liquid is not discharged from the inside of the bellows pump 53 of the pump device P1.

Subsequently, step 18 ("Exhaust After Replenishment" in FIG. 13) will be described. In step 18, the control device CU makes an instruction to open the valve V11. Accordingly, among the highly degassed liquid and gases stored within the bellows pump 53 of the pump device P1, a part of the degassed liquid, together with the gases separated from the processing liquid by degassing, is discharged to the outside of the system through the pipes D14 and D16. In step 18, only the gases separated from the processing liquid by degassing may be discharged to the outside of the system.

By steps 13 to 18 as described above, the preparation processing of the highly degassed liquid is completed.

Subsequently, step 19 ("Temporary Liquid Permeation" in FIG. 13) will be described. In step 19, the control device CU makes an instruction to open the valves V13 and V18, to close the valve V11, and to apply a first value to a pressure of the $N_2$ gas flowing in the regulator R3. Here, as illustrated in FIG. 12B, the highly degassed liquid may be circulated between the inlet port 65a and the drain port 65c of the filter device F1. Accordingly, the highly degassed liquid introduced from the inlet port 65a of the filter device F1 gradually flows toward the drain port 65c. That is, the highly degassed liquid gradually permeates the filter main body 64. In step 19, the flow rate of the highly degassed liquid within the filter device F1 is, for example, about 60 ml/min. The time required for step 19 is, for example, about 200 sec. The processing may proceed to step 20 before the highly degassed liquid is discharged from the drain port 65c.

Subsequently, step 20 ("Initial Liquid Permeation" in FIG. 13) will be described. In step 20, the control device CU makes an instruction to open the valves V26 and V30, to close the valve V18, and to apply a second value to a pressure of the N2 gas flowing in the regulator R3. Here, as illustrated in FIGS. 12C and D, the highly degassed liquid may be circulated between the inlet port 65a and the outlet port 65b of the filter device F1. The second value is set to be higher than the first value. Accordingly, the inside of the gas chamber C2 of the pump device P1 is pressurized at a higher pressure. Accordingly, the highly degassed liquid introduced from the inlet port 65a of the filter device F1 flows toward the outlet port 65b at a higher flow rate as compared to in step 19. As a result, the highly degassed liquid further permeates the filter main body 64, as illustrated in FIG. 12C. As illustrated in FIG. 12D, the highly degassed liquid which has permeated almost the whole of the filter main body 64 passes through the inside of the inner wall 63b of the filter container 63, and then is discharged from the outlet port 65b. The highly degassed liquid discharged from the outlet port 65b is discharged to the outside of the system through the pipes D23, D32, D2 and D34. The flow rate of the highly degassed liquid within the filter device F1 in step 20 is, for example, about 75 ml/min. The time required for step 20 is, for example, about 640 sec.

However, when the filter main body 64 in a dried state is provided in the filter device F1 due to replacement of the filter 62, gases or many particles are included in the filter main body 64. When the highly degassed liquid is circulated in the filter 62 in the above described state, the gases and particles may be discharged from the inside of the filter main body 64. However, many particles are entrained in the highly degassed liquid so that the highly degassed liquid is contaminated. However, since the pipe D34 leads to the outside of the system, the contaminated highly degassed liquid may be discharged to the outside of the system without being returned to the pump device P1.

Subsequently, step 21 ("Pressure Retention" of FIG. 13) will be described. In step 21, the control device CU makes an instruction to close the valves V26 and V30. Here, as illustrated in FIG. 12E, since both the valves V18 and V26 at the downstream side of the drain port 65c and the outlet port 65b are closed, the highly degassed liquid introduced from the inlet port 65a of the filter device F1 stays within the filter device F1. Further, since the highly degassed liquid is about to be fed at the upstream side of the filter device F1 within the filter device F1, the pressure within the filter device F1 is increased. Accordingly, the highly degassed liquid may more easily permeate the whole of the filter main body 64. This may further facilitate the discharge of the fine bubbles from the filter main body 64. The time required for step 21 is, for example, about 600 sec.

Subsequently, step 22 ("Liquid Permeation" of FIG. 13) will be described. In step 22, the control device CU makes an instruction to open the valves V26 and V30. Here, as illustrated in FIG. 12F, the highly degassed liquid may be circulated between the inlet port 65*a* and the outlet port 65*b* of the filter device F1. Further, since the valve V5 is opened, the inside of the gas chamber C2 of the pump device P1 is pressurized at a higher pressure in combination with the action of the regulator R3. Accordingly, the highly degassed liquid introduced from the inlet port 65*a* of the filter device F1 flows within the filter device F1 at a higher flow velocity, as compared to in step 19, and is discharged from the outlet port 65*b*. In step 22, the highly degassed liquid is allowed to continuously flow in the filter device F1 for a predetermined length of time. The highly degassed liquid discharged from the outlet port 65*b* is discharged to the outside of the system through the pipes D23, D32, D2 and D34. In step 22, the flow rate of the highly degassed liquid within the filter device F1 is, for example, about 75 ml/min. The time required for the step 22 is, for example, about 3250 sec.

Subsequently, step 23 ("End" of FIG. 13) will be described. In step 23, the control device CU makes an instruction to open the valves V4 and V31, to close the valves V5 and V30, and to stop the regulator R3. Accordingly, each of the valves and regulators is shifted to the state which is the same as that of step 11. Accordingly, the processing liquid is circulated again through the first circulation line.

In the filter maintenance mode as described above, in step 19 ("Temporary Liquid Permeation" in FIG. 13), the highly degassed liquid is supplied to the filter device F1 from the pump device P1 at a first flow rate, and in step 20 ("Initial Liquid Permeation" in FIG. 13) following step 19, the highly degassed liquid is supplied from the pump device P1 to the filter device F1 at a second flow rate which is higher than the first flow rate. Accordingly, in step 19, the highly degassed liquid gradually permeates the filter main body 64 within the filter device F1, and then in step 20, permeates almost the whole of the filter main body 64. When the filter main body 64 comes in contact with the highly degassed liquid at a relatively high flow rate from the beginning, the highly degassed liquid may not permeate the whole of the filter main body 64, and large and fine bubbles may be present in the filter main body 64. However, through the steps 19 and 20 as described above, the highly degassed liquid gradually permeates the filter main body 64, and thus large and fine bubbles in the filter main body 64 may be discharged to the outside of the filter main body 64. Further, in the filter maintenance mode, in step 22 ("Liquid Permeation" of FIG. 13), the highly degassed liquid is caused to flow from the pump device P1 to the filter device F1 for a predetermined length of time. Accordingly, the fine bubbles within the filter main body 64 may be more effectively discharged to the outside of the filter main body 64 by the highly degassed liquid. As a result, the performance of the filter main body 64 may be improved. Meanwhile, the replacement of the filter 62 may also improve the performance of the filter main body 64. However, during the replacement of the filter 62, the supply system 24*a* configured to eject the processing liquid to a substrate W has to be stopped, and the productivity may be reduced. However, when the filter maintenance mode is employed, the highly degassed liquid is caused to flow so that the performance of the filter main body 64 may be improved, and there is no need to stop the supply system 24*a*. Thus, there is almost no concern about reduction of the productivity. Also, the filter maintenance mode may be employed in both a case where when the filter 62 is used for a predetermined period, bubbles are accumulated in the filter main body 64, thereby reducing the performance of the filter main body 64, and a case where the filter main body 64 in a dried state is provided in the filter device F1 by replacement of the filter 62.

Another Exemplary Embodiment

Figure 14:
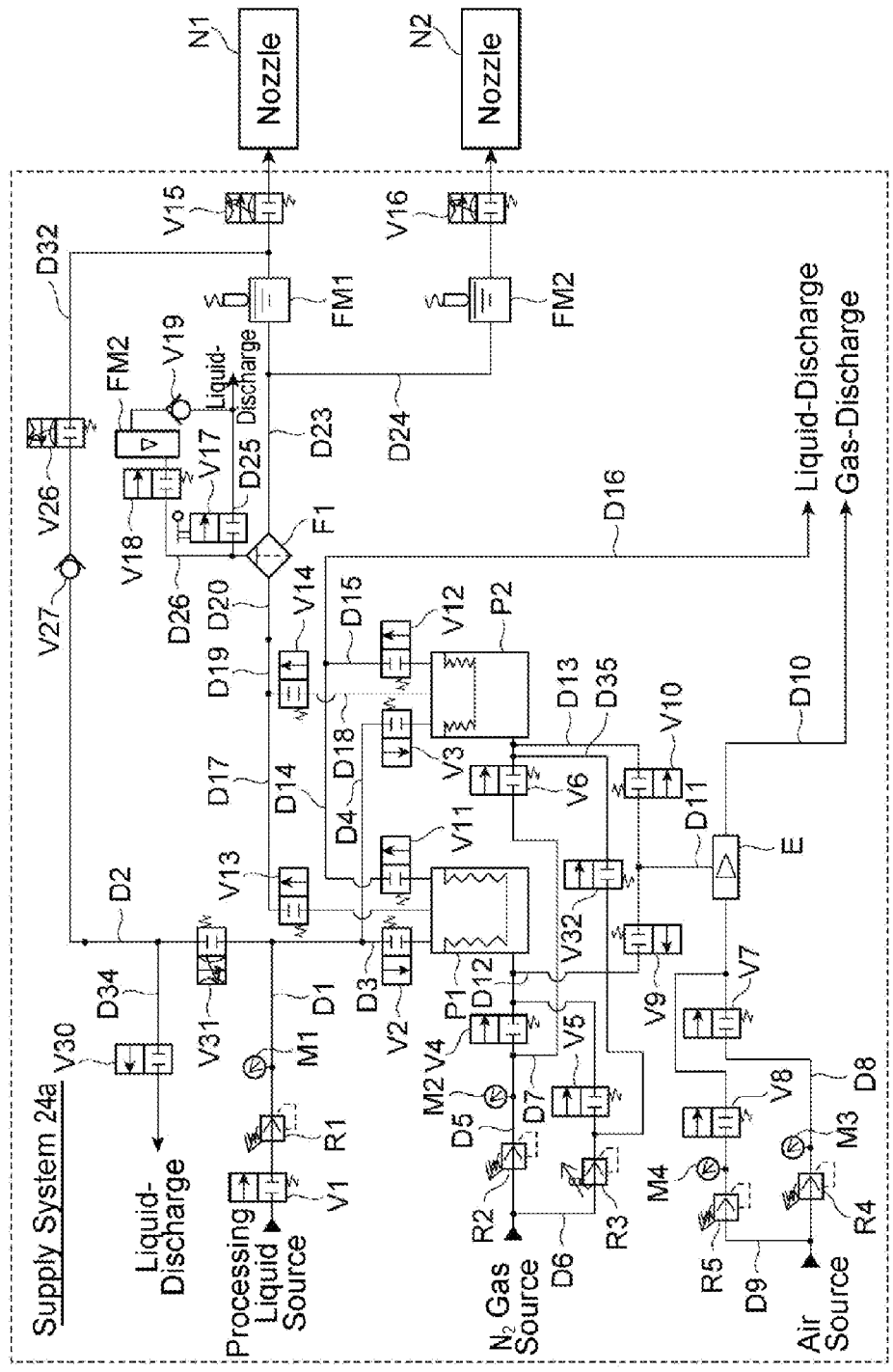
FIG. 14 is a view illustrating another example of the liquid supply system.

As described above, an exemplary embodiment of the present disclosure has been described in detail, but the present disclosure is not limited to the above described exemplary embodiment. For example, a supply system 24*a* having a different configuration from the above described exemplary embodiment may be employed. Another example of the supply system 24*a* is illustrated in FIG. 14. In the supply system 24*a*, the downstream side configuration of the pipe D19 is different from that in the above described exemplary embodiment. Hereinafter, in particular, descriptions will be made focusing on different features. The downstream side of the pipe D19 does not diverge, and the downstream end of the pipe D19 is connected to the upstream end of the pipe D20. The downstream end of the pipe D20 is connected to the inlet port 65*a* of the filter device F1. In the pipe D23, the flowmeter FM1, the valve V15 and the nozzle N1 are provided in this order from the upstream side. The pipe D24 diverges from the pipe D23 at the upstream side of the flowmeter FM1. In the pipe D24, the flowmeter FM2, the valve V16 and the nozzle N2 are provided in this order from the upstream side. In another example of the supply system 24*a*, the pipes D23 and D24 diverge from the downstream side of the filter device F1, and thus the processing liquid which has passed through the filter device F1 is caused to flow in a plurality of pipes. Accordingly, a reduction of a cost may be achieved without providing a filter device in each pipe.

The piston plate 53*a* of the bellows pump 53 may be operated by using a mechanical element such as a linear actuator without using a force of a fluid such as a N2 gas source and an air source.

Besides the bellows pump 53, a variable displacement pump may be used.

In the above described exemplary embodiment, according to a change of the volume of the bellows pump 53, the processing liquid is supplied into the bellows pump 53 or discharged from the inside of the bellows pump 53. However, a pump with a fixed volume may be used so that the processing liquid may be supplied into the pump or discharged from the inside of the pump by setting the pressure within the pump to a relatively high value or a relatively low value.

In the above described exemplary embodiment, the degassed liquid is prepared through operations of the pump devices P1 and P2 by using the degassing nozzle 52*a*. However, the degassing nozzle 52*a* may not be provided in the pump devices P1 and P2, and a degassed liquid prepared in another device may be supplied to the pump devices P1 and P2.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method of removing bubbles, the method comprising:
providing a bubble removing apparatus comprising a supply source that supplies a processing liquid to a substrate, a container configured to store the processing liquid supplied from the supply source, a degassing nozzle provided between the supply source and the container and having a smaller flow path area at a container side than at a supply source side, an ejecting line configured to eject the processing liquid discharged from the container to the substrate, a circulation line diverging from the ejecting line and configured to return the processing liquid from the ejecting line to the container, a filter device including a filter provided in the ejecting line and configured to filter the processing liquid, a first step of supplying the processing liquid into the container through the degassing nozzle so as to degas the processing liquid supplied from the supply source;

after the first step, a second step of supplying a first degassed liquid which is the processing liquid degassed in the first step from the container to the filter device at a first processing liquid flow rate for a first predetermined length of time;

after the second step, a third step of supplying the first degassed liquid from the container to the filter device at a second processing liquid flow rate which is higher than the first processing liquid flow rate for a second predetermined length of time;

after the third step, a fourth step of supplying the processing liquid into the container through the degassing nozzle so as to degas the processing liquid supplied from the supply source; and after the fourth step, a fifth step of supplying a second degassed liquid which is the processing liquid degassed in the fourth step from the container to the filter device such that the second degassed liquid passing the filter of the filter device is selectively ejected to the substrate through the ejecting line, circulated through the circulation line so as to be returned to the container or discharged to the outside of the bubble removing apparatus, wherein a supplying speed of the processing liquid from the supply source into the container at the first step is faster than a supplying speed of the processing liquid from the supply source into the container at the fourth step.

2. The method of claim 1, further comprising:
after the second step and before the third step, a sixth step of pressurizing an inside of the filter device.

3. The method of claim 1, further comprising:
before the first step, a seventh step of discharging the processing liquid stored in the container to an outside of the container.

4. The method of claim 1, wherein the container is a variable displacement pump, in the first step, a volume of the pump is expanded so that the processing liquid is supplied from the supply source into the pump, and in the second to fourth steps, the volume of the pump is contracted so that the first degassed liquid is supplied from the pump into the filter device.

5. A bubble removing apparatus comprising:
a first container configured to temporarily store a processing liquid for a substrate, the processing liquid being supplied from a supply source;

a first degassing nozzle located between the supply source and the first container and including a flow path having an area which is smaller at the first container side than at the supply source side;

an ejecting line configured to eject the processing liquid discharged from the first container, to the substrate;

a circulation line diverging from the ejecting line and configured to return the processing liquid from the ejecting line to the first container;

a filter device provided in the ejecting line, and including a filter;

a supply discharge section configured to store, within the first container, a degassed liquid which is the processing liquid degassed by supplying the processing liquid from the supply source into the first container through the first degassing nozzle, and discharge the degassed liquid within the first container to the ejecting line; and a control unit configured to control the supply discharge section, wherein the control unit is programmed to cause the supply discharge section to perform:

a first operation of storing, within the first container, a first degassed liquid which is the processing degassed by supplying the processing liquid from the supply source into the first container through the first degassing nozzle;

after the first operation, a second operation of supplying the first degassed liquid from the first container to the filter device at a first processing liquid flow rate for a first predetermined length of time;

after the second operation, a third operation of supplying the first degassed liquid from the first container to the filter device at a second processing liquid flow rate which is higher than the first processing liquid flow rate for a second predetermined length of time;

after the third operation, a fourth operation of storing, within the first container, a second degassed liquid which is the processing liquid degassed by supplying the processing liquid from the supply source into the first container through the first degassing nozzle; and after the fourth operation, a fifth operation of supplying the second degassed liquid to the filter device such that the second degassed liquid passing the filter of the filter device is selectively ejected to the substrate through the ejecting line, circulated through the circulation line so as to be returned to the first container, or discharged to the outside of the bubble removing apparatus, and wherein a supplying speed of the processing liquid from the supply source into the first container at the first operation is faster than a supplying speed of the processing liquid from the supply source into the first container at the fourth operation.

6. The bubble removing apparatus of claim 5, wherein the first container is a variable displacement pump, when causing the supply discharge section to perform the first second operation, the control unit is programmed to pressurize the pump at a first pressure so as to contract a volume of the pump, and when causing the supply discharge section to perform the third operation, the control unit is programmed to pressurize the pump at a second pressure higher than the first pressure so as to contract the volume of the pump.

7. The bubble removing apparatus of claim 5,
wherein the filter device is provided in the ejecting line nearer to the first container side as compared to a junction of the circulation line.

8. The bubble removing apparatus of claim 7, wherein a discharging line is provided in the circulation line to discharge the processing liquid which flows in the circulation line.

9. The bubble removing apparatus of claim 5, further comprising:
- a second container configured to temporarily store a processing liquid for the substrate, the processing liquid being supplied from the supply source; and
- a second degassing nozzle located between the supply source and the second container and having a smaller flow path area at the second container side than at the supply source side, wherein the processing liquid to be ejected to the substrate is discharged from each of the first container and the second container to the ejecting line,
- the supply discharge section is configured to store, within the second container, a degassed liquid which is the processing liquid degassed by supplying the processing liquid from the supply source into the second container through the second degassing nozzle, and discharge the degassed liquid within the second container to the ejecting line, and
- the control unit is further programmed to cause the supply discharge section to suppress the degassed liquid within the second container from being supplied to the filter device when the degassed liquid within the first container is supplied to the filter device, and to suppress the degassed liquid within the first container from being supplied to the filter device when the degassed liquid within the second container is supplied to the filter device.

10. The bubble removing apparatus of claim 5, wherein the ejecting line diverges into a plurality of sub-lines.

11. The bubble removing apparatus of claim 10, wherein the ejecting line diverges into a plurality of sub-lines at a downstream side of the filter device.

12. The method of claim 4, wherein
- in the second step, the first degassed processing liquid is supplied to the filter device at the first processing liquid flow rate by pressurizing the pump at a first pressure, and
- in the third step, the first degassed processing liquid is supplied to the filter device at the second processing liquid flow rate by pressurizing the pump at a second pressure which is higher than the first pressure.

* * * * *